US011997185B2

(12) United States Patent
Berger et al.

(10) Patent No.: US 11,997,185 B2
(45) Date of Patent: May 28, 2024

(54) DEMODULATOR CONFIGURATION BASED ON USER EQUIPMENT SIGNALING

(71) Applicant: QUALCOMM Incorporated, San Diego, CA (US)

(72) Inventors: Peer Berger, Hod Hasharon (IL); Shay Landis, Hod Hasharon (IL); Jacob Pick, Beit Zait (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/356,108

(22) Filed: Jun. 23, 2021

(65) Prior Publication Data

US 2022/0416993 A1 Dec. 29, 2022

(51) Int. Cl.
*H04L 7/04* (2006.01)
*H04L 27/26* (2006.01)
*H04W 72/21* (2023.01)

(52) U.S. Cl.
CPC .......... *H04L 7/042* (2013.01); *H04L 27/2649* (2013.01); *H04L 27/2657* (2013.01); *H04W 72/21* (2023.01)

(58) Field of Classification Search
CPC . H04W 72/14; H04W 72/1294; H04W 72/12; H04W 72/1226; H04W 72/1278; H04W 28/0231; H04W 28/0278
See application file for complete search history.

(56) References Cited

U.S. PATENT DOCUMENTS 7,286,850 B2 * 10/2007 Frielink ................ G06F 1/1616
361/679.55
8,179,876 B2 * 5/2012 Agrawal ............. H04L 27/2627
455/450

(Continued)

FOREIGN PATENT DOCUMENTS

EP 2884677 A1 * 6/2015 ........... H04B 7/0413
EP 2892169 A2 * 7/2015 ............. H04L 25/03

(Continued)

OTHER PUBLICATIONS

TS 136 101-V10.16.0—LTE; Evolved Universal Terrestrial Radio Access (E-UTRA); User Equipment (UE) radio Transmission and reception (3GPP TS 36.101 version 10.16.0 Release 10), Nov. 2014 (Year: 2014).*

(Continued)

*Primary Examiner* — Berhanu Tadese
(74) *Attorney, Agent, or Firm* — Holland & Hart LLP

(57) ABSTRACT

Methods, systems, and devices for wireless communications are described. A base station may transmit an indication of a demodulator configuration to a user equipment (UE) for the UE to use that demodulator configuration for demodulating a multi-layer transmission from the base station. The base station may determine the demodulator configuration for the UE to use based on one or more uplink signals transmitted from the UE. Additionally, the UE may transmit an indication of demodulator capabilities that the UE supports to the base station, where the base station determines the demodulator configuration based on the indication of the demodulator capabilities. In some examples, the demodulator configuration may indicate a demodulation search space corresponding to a number of layers included per layer group of the multi-layer transmission, may correspond to an amount of cross correlation determined between respective (Continued)

layers of the multi-layer transmission, or a combination thereof.

30 Claims, 18 Drawing Sheets

(56) References Cited

U.S. PATENT DOCUMENTS

| | | | | |
|---|---|---|---|---|
| 8,804,883 B2* | 8/2014 | Khayrallah | ....... | H04L 25/03197 375/346 |
| 8,842,585 B2* | 9/2014 | Suzuki | ........ | H04L 5/001 370/278 |
| 9,047,698 B2* | 6/2015 | Maciocci | ........ | H04N 9/3173 |
| 9,142,062 B2* | 9/2015 | Maciocci | ........ | G06F 3/147 |
| 9,198,157 B2* | 11/2015 | Zhao | ........ | H04W 68/00 |
| 9,226,287 B2* | 12/2015 | Suzuki | ........ | H04W 72/23 |
| 9,292,764 B2* | 3/2016 | Yun | ........ | G06F 16/9537 |
| 9,337,664 B2* | 5/2016 | Von Novak | ........ | H02J 50/12 |
| 9,384,594 B2* | 7/2016 | Maciocci | ........ | G06T 17/05 |
| 9,445,413 B2* | 9/2016 | Seo | ........ | H04L 5/00 |
| 9,497,753 B2* | 11/2016 | Seo | ........ | H04L 5/0053 |
| 9,549,400 B2* | 1/2017 | Seo | ........ | H04W 72/0446 |
| 9,565,667 B2* | 2/2017 | Seo | ........ | H04L 5/0048 |
| 9,615,365 B2* | 4/2017 | Seo | ........ | H04L 27/0012 |
| 9,674,710 B2* | 6/2017 | Chen | ........ | H04W 16/26 |
| 9,750,036 B2* | 8/2017 | Seo | ........ | H04W 72/23 |
| 9,756,623 B2* | 9/2017 | Seo | ........ | H04L 5/0053 |
| 9,769,807 B2* | 9/2017 | Jöngren | ........ | H04L 5/0094 |
| 9,769,810 B2* | 9/2017 | Imamura | ........ | H04B 7/0452 |
| 9,769,815 B2* | 9/2017 | Seo | ........ | H04L 5/0053 |
| 9,780,657 B2* | 10/2017 | Wang | ........ | H02M 3/158 |
| 9,780,847 B2* | 10/2017 | Budianu | ........ | H04L 1/0029 |
| 9,788,330 B2* | 10/2017 | Guo | ........ | H04L 5/0091 |
| 9,794,913 B2* | 10/2017 | Lee | ........ | H04L 5/0053 |
| 9,825,798 B1* | 11/2017 | Sun | ........ | H04L 27/362 |
| 9,848,441 B2* | 12/2017 | Kim | ........ | H04L 5/0092 |
| 9,867,173 B2* | 1/2018 | Seo | ........ | H04L 5/0053 |
| 9,882,623 B2* | 1/2018 | Sun | ........ | H04B 7/0626 |
| 9,918,323 B2* | 3/2018 | Seo | ........ | H04W 72/23 |
| 9,929,812 B2* | 3/2018 | Manolakos | ........ | H04L 43/16 |
| 9,942,013 B2* | 4/2018 | Malladi | ........ | H04J 11/0056 |
| 10,028,266 B2* | 7/2018 | Seo | ........ | H04W 72/23 |
| 10,038,544 B2* | 7/2018 | Zeng | ........ | H04L 5/14 |
| 10,051,634 B2* | 8/2018 | Soriaga | ........ | H04W 72/0473 |
| 10,090,978 B2* | 10/2018 | Sun | ........ | H04W 52/346 |
| 10,117,120 B2* | 10/2018 | Sun | ........ | H04L 5/006 |
| 10,134,808 B2* | 11/2018 | Kan | ........ | H10N 50/80 |
| 10,149,318 B2* | 12/2018 | Sun | ........ | H04W 72/121 |
| 10,172,015 B2* | 1/2019 | Chen | ........ | H04L 1/08 |
| 10,181,934 B2* | 1/2019 | Chen | ........ | H04J 11/0056 |
| 10,201,006 B2* | 2/2019 | Sun | ........ | H04J 11/0036 |
| 10,243,713 B2* | 3/2019 | Chen | ........ | H04L 5/0051 |
| 10,263,660 B2* | 4/2019 | Sun | ........ | H04J 13/10 |
| 10,285,169 B2* | 5/2019 | Sun | ........ | H04L 5/0053 |
| 10,292,158 B2* | 5/2019 | Yerramalli | ........ | H04W 74/0808 |
| 10,334,557 B2* | 6/2019 | Zhao | ........ | H04W 68/00 |
| 10,334,579 B2* | 6/2019 | Seo | ........ | H04L 5/0053 |
| 10,356,811 B2* | 7/2019 | Luo | ........ | H04W 52/14 |
| 10,397,032 B2* | 8/2019 | Sun | ........ | H04W 52/346 |
| 10,397,909 B2* | 8/2019 | Seo | ........ | H04W 72/23 |
| 10,411,856 B2* | 9/2019 | Sun | ........ | H04B 17/318 |
| 10,548,153 B2* | 1/2020 | Akkarakaran | ........ | H04L 5/0053 |
| 10,560,304 B2* | 2/2020 | Lei | ........ | H04B 7/0617 |
| 10,575,324 B2* | 2/2020 | Sun | ........ | H04L 1/0038 |
| 10,594,372 B2* | 3/2020 | Prasad | ........ | H04L 27/20 |
| 10,594,652 B2* | 3/2020 | Bhushan | ........ | H04W 72/535 |
| 10,594,653 B2* | 3/2020 | Bhushan | ........ | H04L 5/0042 |
| 10,609,726 B2* | 3/2020 | Hosseini | ........ | H04L 5/0094 |
| 10,630,349 B2* | 4/2020 | Park | ........ | H04W 72/23 |
| 10,630,513 B2* | 4/2020 | Lei | ........ | H04J 13/0007 |
| 10,638,457 B2* | 4/2020 | Lee | ........ | H04L 5/0053 |
| 10,651,961 B2* | 5/2020 | Sun | ........ | H04J 11/004 |
| 10,652,908 B2* | 5/2020 | He | ........ | H04W 28/00 |
| 10,667,244 B2* | 5/2020 | Luo | ........ | H04L 5/0023 |
| 10,667,254 B2* | 5/2020 | Seo | ........ | H04L 27/2613 |
| 10,673,674 B2* | 6/2020 | Lei | ........ | H04B 7/0452 |
| 10,673,675 B2* | 6/2020 | Lei | ........ | H04W 72/046 |
| 10,673,676 B2* | 6/2020 | Lei | ........ | H04L 27/38 |
| 10,681,722 B2* | 6/2020 | Maaref | ........ | H04L 1/0045 |
| 10,686,490 B2* | 6/2020 | Park | ........ | H04L 1/005 |
| 10,694,531 B2* | 6/2020 | Sun | ........ | H04W 72/121 |
| 10,708,728 B2* | 7/2020 | Sun | ........ | H04W 72/12 |
| 10,708,907 B2* | 7/2020 | He | ........ | H04W 72/541 |
| 10,728,000 B2* | 7/2020 | Lei | ........ | H04L 27/261 |
| 10,728,215 B2* | 7/2020 | Bhushan | ........ | H04W 72/04 |
| 10,736,111 B2* | 8/2020 | Soriaga | ........ | H04L 1/0057 |
| 10,743,338 B2* | 8/2020 | Hosseini | ........ | H04L 5/0044 |
| 10,749,726 B2* | 8/2020 | Park | ........ | H04L 27/3411 |
| 10,762,336 B2* | 9/2020 | Boenapalli | ........ | H04N 23/71 |
| 10,771,105 B2* | 9/2020 | Park | ........ | H04J 13/0003 |
| 10,785,794 B2* | 9/2020 | Luo | ........ | H04L 5/0053 |
| 10,791,522 B2* | 9/2020 | Wu | ........ | H04W 72/0473 |
| 10,797,748 B2* | 10/2020 | Park | ........ | H04J 13/0062 |
| 10,813,054 B2* | 10/2020 | Gupta | ........ | H04W 72/0473 |
| 10,820,308 B2* | 10/2020 | Cui | ........ | H04W 72/23 |
| 10,862,722 B2* | 12/2020 | Lei | ........ | H04J 13/0014 |
| 10,863,334 B2* | 12/2020 | Wang | ........ | H04L 5/0051 |
| 10,880,033 B2* | 12/2020 | Park | ........ | H04W 72/1263 |
| 10,880,139 B2* | 12/2020 | Sun | ........ | H04L 5/005 |
| 10,880,864 B2* | 12/2020 | Zhang | ........ | H04L 27/2646 |
| 10,897,340 B2* | 1/2021 | Li | ........ | H04W 76/27 |
| 10,904,868 B2* | 1/2021 | Lei | ........ | H04L 5/0037 |
| 10,924,167 B2* | 2/2021 | Lei | ........ | H04W 72/56 |
| 10,951,296 B1* | 3/2021 | Li | ........ | H04L 27/2614 |
| 10,958,300 B2* | 3/2021 | Park | ........ | H04J 13/16 |
| 10,958,304 B2* | 3/2021 | Park | ........ | H04L 27/34 |
| 10,980,067 B2* | 4/2021 | Lei | ........ | H04L 5/0053 |
| 10,985,880 B2* | 4/2021 | Lei | ........ | H04W 72/23 |
| 10,999,863 B2* | 5/2021 | Jeon | ........ | H04W 72/0446 |
| 11,044,735 B2* | 6/2021 | Akkarakaran | ........ | H04W 72/23 |
| 11,051,330 B2* | 6/2021 | Maaref | ........ | H04L 5/0048 |
| 11,063,800 B2* | 7/2021 | Akkarakaran | ........ | H04L 27/262 |
| 11,075,709 B2* | 7/2021 | Park | ........ | H04L 5/0026 |
| 11,075,732 B2* | 7/2021 | Sun | ........ | H04B 17/318 |
| 11,088,800 B2* | 8/2021 | Joseph | ........ | H04L 5/0055 |
| 11,089,598 B2* | 8/2021 | Lei | ........ | H04J 11/004 |
| 11,095,404 B2* | 8/2021 | Tavildar | ........ | H04W 72/27 |
| 11,096,214 B2* | 8/2021 | Gulati | ........ | H04L 5/0053 |
| 11,101,910 B2* | 8/2021 | Park | ........ | H04J 13/0044 |
| 11,115,170 B2* | 9/2021 | Yerramalli | ........ | H04L 1/1812 |
| 11,172,444 B2* | 11/2021 | Jiang | ........ | H04W 52/346 |
| 11,177,923 B2* | 11/2021 | Cheng | ........ | H04L 5/0053 |
| 11,184,867 B2* | 11/2021 | O'Shea | ........ | H04W 72/1215 |
| 11,196,525 B2* | 12/2021 | Li | ........ | H04L 1/1858 |
| 11,212,833 B2* | 12/2021 | Lei | ........ | H04L 5/0026 |
| 11,224,077 B2* | 1/2022 | Lei | ........ | H04W 52/42 |
| 11,245,499 B2* | 2/2022 | Lei | ........ | H04W 72/00 |
| 11,259,252 B2* | 2/2022 | Lei | ........ | H04L 5/0053 |
| 11,265,134 B2* | 3/2022 | Gulati | ........ | H04L 5/0055 |
| 11,265,876 B2* | 3/2022 | Hosseini | ........ | H04W 72/23 |
| 11,265,909 B2* | 3/2022 | He | ........ | H04W 76/27 |
| 11,272,482 B2* | 3/2022 | Gulati | ........ | H04L 1/1896 |
| 11,291,026 B2* | 3/2022 | Hosseini | ........ | H04W 72/20 |
| 11,324,040 B2* | 5/2022 | Li | ........ | H04L 5/0012 |
| 11,329,773 B2* | 5/2022 | Lei | ........ | H04W 72/044 |
| 11,330,584 B2* | 5/2022 | He | ........ | H04L 7/0331 |
| 11,350,402 B2* | 5/2022 | Seo | ........ | H04L 25/03 |
| 11,368,919 B2* | 6/2022 | Gupta | ........ | H04W 52/146 |
| 11,497,014 B2* | 11/2022 | Chen | ........ | H04W 72/23 |
| 11,622,371 B2* | 4/2023 | Akkarakaran | ........ | H04L 5/0051 370/329 |
| 11,700,092 B2* | 7/2023 | Zhou | ........ | H04L 5/0092 370/330 |
| 2015/0103807 A1* | 4/2015 | Montojo | ........ | H04J 11/0053 370/335 |
| 2015/0319775 A1* | 11/2015 | Takeda | ........ | H04L 25/00 370/329 |
| 2015/0358971 A1* | 12/2015 | Soriaga | ........ | H04J 13/00 370/328 |
| 2016/0065351 A1* | 3/2016 | Zhang | ........ | H04L 27/183 370/329 |
| 2016/0066345 A1* | 3/2016 | Sun | ........ | H04J 11/004 370/329 |

(56) References Cited

U.S. PATENT DOCUMENTS

| | | | |
|---|---|---|---|
| 2016/0119807 A1* | 4/2016 | Sun | H04L 5/0091 370/252 |
| 2016/0128045 A1* | 5/2016 | Azarian Yazdi | H04B 7/0413 370/330 |
| 2016/0270102 A1* | 9/2016 | Zeng | H04W 72/23 |
| 2017/0012754 A1* | 1/2017 | Sun | H04W 72/541 |
| 2017/0013599 A1* | 1/2017 | Sun | H04W 72/23 |
| 2017/0170943 A1* | 6/2017 | Zeng | H04W 52/0219 |
| 2017/0295500 A1* | 10/2017 | Sun | H04B 7/0456 |
| 2017/0331662 A1* | 11/2017 | Sun | H04L 27/3411 |
| 2018/0048335 A1* | 2/2018 | Sun | H04L 1/005 |
| 2018/0048349 A1* | 2/2018 | Sun | H04L 25/00 |
| 2018/0206263 A1* | 7/2018 | Lin | H04W 56/003 |
| 2018/0324809 A1* | 11/2018 | Soriaga | H04W 72/0466 |
| 2019/0075591 A1* | 3/2019 | Sun | H04J 11/004 |
| 2019/0097677 A1* | 3/2019 | Sen | H04J 13/18 |
| 2019/0159181 A1* | 5/2019 | Manolakos | H04W 72/23 |
| 2019/0222342 A1* | 7/2019 | Park | H04L 5/0048 |
| 2019/0222343 A1* | 7/2019 | Park | H04W 72/1263 |
| 2019/0229957 A1* | 7/2019 | Lei | H04B 7/0456 |
| 2019/0238367 A1* | 8/2019 | Lei | H04L 5/0051 |
| 2019/0253172 A1* | 8/2019 | Park | H04L 5/0026 |
| 2019/0260417 A1* | 8/2019 | Park | H04J 13/16 |
| 2019/0260418 A1* | 8/2019 | Park | H04J 13/16 |
| 2019/0260419 A1* | 8/2019 | Park | H04L 1/0003 |
| 2019/0261278 A1* | 8/2019 | Gupta | H04L 5/0035 |
| 2019/0296873 A1* | 9/2019 | Gupta | H04B 7/024 |
| 2019/0297489 A1* | 9/2019 | Lei | H04W 64/00 |
| 2019/0312691 A1* | 10/2019 | Park | H04L 1/0041 |
| 2019/0313402 A1* | 10/2019 | Lei | H04L 5/0016 |
| 2019/0327061 A1* | 10/2019 | Li | H04W 72/0466 |
| 2019/0334686 A1* | 10/2019 | Li | H04L 1/0003 |
| 2019/0363846 A1* | 11/2019 | Lei | H04L 5/001 |
| 2019/0372735 A1* | 12/2019 | Sun | H04L 5/0048 |
| 2019/0393998 A1* | 12/2019 | Lei | H04W 88/02 |
| 2020/0028623 A1* | 1/2020 | Park | H04W 76/27 |
| 2020/0052825 A1* | 2/2020 | Sarkis | H04W 52/121 |
| 2020/0077402 A1* | 3/2020 | Lei | H04L 1/0003 |
| 2020/0092056 A1* | 3/2020 | Lei | H04L 5/0012 |
| 2020/0146055 A1* | 5/2020 | Lei | H04J 11/0023 |
| 2020/0196349 A1* | 6/2020 | He | H04W 72/1268 |
| 2020/0221426 A1* | 7/2020 | Lee | H04L 5/0053 |
| 2020/0260438 A1* | 8/2020 | Luo | H04L 5/001 |
| 2020/0260499 A1* | 8/2020 | Sarkis | H04W 74/006 |
| 2020/0288506 A1* | 9/2020 | Lei | H04W 74/0833 |
| 2020/0374917 A1* | 11/2020 | Takeda | H04L 5/0053 |
| 2020/0413347 A1* | 12/2020 | Gupta | H04L 1/1657 |
| 2021/0007131 A1* | 1/2021 | Luo | H04W 72/23 |
| 2021/0067308 A1* | 3/2021 | Ly | H04L 1/1854 |
| 2021/0068111 A1* | 3/2021 | Cao | H04W 72/21 |
| 2021/0076381 A1* | 3/2021 | Cao | H04L 5/0048 |
| 2021/0105079 A1* | 4/2021 | Lei | H04J 13/0003 |
| 2021/0112600 A1* | 4/2021 | Lei | H04L 5/1469 |
| 2021/0152305 A1* | 5/2021 | Wei | H04W 72/21 |
| 2021/0153284 A1* | 5/2021 | Zhou | H04L 41/0668 |
| 2021/0194556 A1* | 6/2021 | Ly | H04L 5/0094 |
| 2021/0195656 A1* | 6/2021 | Lei | H04W 74/002 |
| 2021/0204186 A1* | 7/2021 | Bodduru | H04L 1/0009 |
| 2021/0226751 A1* | 7/2021 | Zhang | H04W 72/21 |
| 2021/0266927 A1* | 8/2021 | Zeng | H04W 72/52 |
| 2021/0274515 A1* | 9/2021 | Lei | H04W 8/24 |
| 2021/0289534 A1* | 9/2021 | Lei | H04W 72/20 |
| 2021/0298052 A1* | 9/2021 | Namba | H04L 1/1851 |
| 2021/0320765 A1* | 10/2021 | Tavildar | H04L 27/0008 |
| 2021/0321276 A1* | 10/2021 | Kim | H04W 76/27 |
| 2021/0352626 A1* | 11/2021 | Sarkis | H04W 72/20 |
| 2021/0352707 A1* | 11/2021 | Maaref | H04L 5/0051 |
| 2021/0360611 A1* | 11/2021 | Manolakos | H04L 5/0053 |
| 2021/0399823 A1* | 12/2021 | Park | H04L 5/0021 |
| 2022/0007428 A1* | 1/2022 | Lei | H04L 5/0094 |
| 2022/0030618 A1* | 1/2022 | Wang | H04L 1/0003 |
| 2022/0061030 A1* | 2/2022 | Wu | H04W 72/21 |
| 2022/0069954 A1* | 3/2022 | Lei | H04L 1/0061 |
| 2022/0086917 A1* | 3/2022 | Lei | H04W 52/146 |
| 2022/0095378 A1* | 3/2022 | Lei | H04W 74/0833 |
| 2022/0104211 A1* | 3/2022 | Elshafie | H04W 8/04 |
| 2022/0116764 A1* | 4/2022 | Pezeshki | H04W 72/20 |
| 2022/0132522 A1* | 4/2022 | Wei | H04W 72/23 |
| 2022/0150845 A1* | 5/2022 | Lei | H04W 72/21 |
| 2022/0165167 A1* | 5/2022 | Cao | G08G 5/0052 |
| 2022/0210838 A1* | 6/2022 | Lei | H04L 5/0048 |
| 2022/0353694 A1* | 11/2022 | Ly | H04L 1/1864 |
| 2022/0369357 A1* | 11/2022 | Luo | H04W 24/08 |
| 2022/0416993 A1* | 12/2022 | Berger | H04L 7/042 |
| 2023/0047646 A1* | 2/2023 | Manolakos | H04L 5/0048 |
| 2023/0112599 A1* | 4/2023 | Chen | H04W 48/12 370/336 |
| 2023/0156676 A1* | 5/2023 | Gao | H04L 5/0051 370/329 |

FOREIGN PATENT DOCUMENTS

| | | | | |
|---|---|---|---|---|
| EP | 2897435 | A1 * | 7/2015 | H04L 1/0038 |
| EP | 2928249 | A1 * | 10/2015 | H04L 25/00 |
| EP | 2983305 | A1 * | 2/2016 | H04W 72/0406 |
| EP | 2928249 | B1 * | 5/2018 | H04L 25/00 |
| EP | 2897435 | B1 * | 11/2019 | H04L 1/0038 |
| EP | 2892169 | B1 * | 12/2019 | H04L 25/03 |
| EP | 3777404 | A1 * | 2/2021 | H04L 25/0202 |
| EP | 3782314 | A1 * | 2/2021 | H04L 1/0057 |
| EP | 3785386 | A1 * | 3/2021 | H04B 17/336 |
| EP | 3799463 | A1 * | 3/2021 | H04B 7/0697 |
| EP | 3804201 | A1 * | 4/2021 | H04J 15/00 |
| EP | 3811548 | A1 * | 4/2021 | H04L 1/0004 |
| EP | 3811708 | A1 * | 4/2021 | H04B 1/69 |
| EP | 3831113 | A1 * | 6/2021 | H04L 1/0023 |
| EP | 3776999 | B1 * | 1/2022 | H04L 27/20 |
| EP | 3937561 | A1 * | 1/2022 | H04L 1/0004 |
| EP | 3955471 | A1 * | 2/2022 | H04B 7/0456 |
| EP | 4009569 | A2 * | 6/2022 | H04B 7/0452 |
| JP | 6599535 | B2 * | 10/2019 | H04L 27/183 |
| JP | 6732876 | B2 * | 7/2020 | H04B 7/0456 |
| JP | 6749881 | B2 * | 9/2020 | H04L 1/004 |
| JP | 6805178 | B2 * | 12/2020 | H04L 1/1607 |
| JP | 6882407 | B2 * | 6/2021 | H04B 17/318 |
| JP | 6891237 | B2 * | 6/2021 | H04J 11/004 |
| JP | 7132351 | B2 * | 9/2022 | H04L 1/0045 |
| JP | 7142668 | B2 * | 9/2022 | H04L 1/004 |
| WO | WO-2005122511 | A1 * | 12/2005 | H04L 1/06 |
| WO | WO-2006069399 | A2 * | 6/2006 | H03L 27/0008 |
| WO | WO-2012176695 | A1 * | 12/2012 | H03M 13/2957 |
| WO | WO-2013009464 | A1 * | 1/2013 | H04L 5/001 |
| WO | WO-2013027926 | A1 * | 2/2013 | H04B 7/2612 |
| WO | WO-2013048082 | A2 * | 4/2013 | H04L 5/0041 |
| WO | WO-2013147566 | A1 * | 10/2013 | H04J 11/00 |
| WO | WO-2019209545 | A1 * | 10/2019 | H04B 17/336 |
| WO | WO-2019222875 | A1 * | 11/2019 | |
| WO | WO-2019226768 | A1 * | 11/2019 | H04J 15/00 |
| WO | WO-2019227375 | A1 * | 12/2019 | |
| WO | WO-2019228255 | A1 * | 12/2019 | G05D 1/0022 |
| WO | WO-2019231852 | A1 * | 12/2019 | H04B 17/336 |
| WO | WO-2019241904 | A1 * | 12/2019 | |
| WO | WO-2019241995 | A1 * | 12/2019 | |
| WO | WO-2019242544 | A1 * | 12/2019 | H04B 1/69 |
| WO | WO-2019245825 | A1 * | 12/2019 | H04L 1/0004 |
| WO | WO-2020014907 | A1 * | 1/2020 | H04W 74/0833 |
| WO | WO-2020019138 | A1 * | 1/2020 | H04L 5/0051 |
| WO | WO-2020023397 | A1 * | 1/2020 | H04J 13/0029 |
| WO | WO-2020024148 | A1 * | 2/2020 | |
| WO | WO-2020024162 | A1 * | 2/2020 | |
| WO | WO-2020024262 | A1 * | 2/2020 | |
| WO | WO-2020024871 | A1 * | 2/2020 | |
| WO | WO-2020025019 | A1 * | 2/2020 | H04L 1/0023 |
| WO | WO-2020033185 | A1 * | 2/2020 | H04L 1/0025 |
| WO | WO-2020033718 | A1 * | 2/2020 | H04L 1/00 |
| WO | WO-2020033722 | A1 * | 2/2020 | H04L 1/1614 |
| WO | WO-2020046674 | A1 * | 3/2020 | H04J 11/004 |
| WO | WO-2020061208 | A1 * | 3/2020 | H04J 13/0003 |
| WO | WO-2020091947 | A1 * | 5/2020 | H04J 11/0023 |
| WO | WO-2020124380 | A1 * | 6/2020 | H04L 1/0018 |
| WO | WO-2020131373 | A1 * | 6/2020 | H04W 72/042 |
| WO | WO-2020131507 | A1 * | 6/2020 | H04L 5/0078 |
| WO | WO-2020092945 | A3 * | 7/2020 | H04L 1/0079 |
| WO | WO-2020146601 | A1 * | 7/2020 | H04L 1/1854 |

(56) References Cited

FOREIGN PATENT DOCUMENTS

| WO | WO-2020168285 A1 | * | 8/2020 | ......... H04W 72/042 |
| WO | WO-2020176225 A1 | * | 9/2020 | ......... H04B 7/0695 |
| WO | WO-2020186398 A1 | * | 9/2020 | |
| WO | WO-2020223899 A1 | * | 11/2020 | |
| WO | WO-2020227858 A1 | * | 11/2020 | |
| WO | WO-2020228597 A1 | * | 11/2020 | ......... H04L 5/0048 |
| WO | WO-2021007323 A1 | * | 1/2021 | ............ H04W 4/70 |
| WO | WO-2021030674 A1 | * | 2/2021 | ......... H04W 52/146 |
| WO | WO-2021041905 A1 | * | 3/2021 | ............ H04L 1/08 |
| WO | WO-2021055144 A1 | * | 3/2021 | ............ H04L 1/08 |
| WO | WO-2021072413 A1 | * | 4/2021 | ......... H04L 5/0007 |
| WO | WO-2021091966 A1 | * | 5/2021 | ......... H04L 5/0001 |
| WO | WO-2021097265 A1 | * | 5/2021 | ............ H04B 7/088 |
| WO | WO-2021127268 A1 | * | 6/2021 | ......... H04B 7/0626 |
| WO | WO-2021133705 A1 | * | 6/2021 | ......... H04L 5/0035 |
| WO | WO-2021146613 A1 | * | 7/2021 | ......... H04B 7/0695 |
| WO | WO-2021154373 A1 | * | 8/2021 | ......... H04L 5/0016 |
| WO | WO-2021178023 A1 | * | 9/2021 | ............ G01S 5/0258 |
| WO | WO-2021183275 A1 | * | 9/2021 | ......... H04L 5/0053 |
| WO | WO-2021202236 A1 | * | 10/2021 | ......... H04J 11/0033 |
| WO | WO-2021207567 A1 | * | 10/2021 | ......... H04B 17/102 |
| WO | WO-2022020694 A1 | * | 1/2022 | ......... H04B 7/0695 |
| WO | WO-2022067270 A1 | * | 3/2022 | ............ H04B 7/155 |
| WO | WO-2022076863 A1 | * | 4/2022 | ......... G06F 21/629 |
| WO | WO-2022081996 A1 | * | 4/2022 | ............ H04W 4/06 |
| WO | WO-2022082356 A1 | * | 4/2022 | |
| WO | WO-2022087115 A1 | * | 4/2022 | ....... H04W 36/0033 |
| WO | WO-2022087202 A2 | * | 4/2022 | ......... H04L 1/1893 |
| WO | WO-2022099181 A2 | * | 5/2022 | ......... H04L 1/1851 |
| WO | WO-2022125886 A1 | * | 6/2022 | ......... H04W 28/26 |
| WO | WO-2022133009 A2 | * | 6/2022 | ......... H04L 5/0048 |
| WO | WO-2022155424 A1 | * | 7/2022 | ............ H04W 4/70 |
| WO | WO-2022155600 A2 | * | 7/2022 | ......... H04L 1/1812 |
| WO | WO-2022159490 A1 | * | 7/2022 | ......... H04W 52/146 |

OTHER PUBLICATIONS

3GPP TS 36.211 V13.0.0, Physical channels and modulation, Dec. 2015, pp. 1-141 (Year: 2015).*

* cited by examiner

DEMODULATOR CONFIGURATION BASED ON USER EQUIPMENT SIGNALING

FIELD OF TECHNOLOGY

The following relates to wireless communications, including demodulator configuration based on user equipment (UE) signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some examples, a base station may transmit downlink messages to a UE, where the downlink messages contain multiple layers (e.g., virtual streams of information transmitted at a same time). To receive and process the information from each of the multiple layers, the UE may use a demodulator on the downlink messages. Techniques are desired for determining a configuration for the demodulator.

SUMMARY

The described techniques relate to improved methods, systems, devices, and apparatuses that support demodulator configuration based on user equipment (UE) signaling. Generally, the described techniques provide for a base station to transmit an indication of a demodulator configuration to a UE for the UE to use that demodulator configuration for demodulating a multi-layer transmission from the base station. The base station may determine the demodulator configuration for the UE to use based on one or more uplink signals transmitted from the UE to the base station that correspond to a condition of a channel, such as sounding reference signal (SRS) transmissions, channel state information (CSI), UE capabilities, precoding supported by the UE, etc. Additionally, the UE may transmit an indication of demodulator capabilities that the UE supports to the base station, where the base station determines the demodulator configuration based on the indication of the demodulator capabilities. In some examples, the demodulator configuration may indicate a demodulation search space corresponding to a number of layers included per layer group of the multi-layer transmission, may correspond to an amount of cross correlation determined between respective layers of the multi-layer transmission, or a combination thereof.

A method for wireless communications at a UE is described. The method may include transmitting, to a base station, at least one uplink signal corresponding to a condition of a wireless channel, receiving, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal, and demodulating the multi-layer signal on the wireless channel in accordance with the demodulator configuration based on receiving the grant.

An apparatus for wireless communications at a UE is described. The apparatus may include a processor, memory coupled with the processor, and instructions stored in the memory. The instructions may be executable by the processor to cause the apparatus to transmit, to a base station, at least one uplink signal corresponding to a condition of a wireless channel, receive, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal, and demodulate the multi-layer signal on the wireless channel in accordance with the demodulator configuration based on receiving the grant.

Another apparatus for wireless communications at a UE is described. The apparatus may include means for transmitting, to a base station, at least one uplink signal corresponding to a condition of a wireless channel, means for receiving, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal, and means for demodulating the multi-layer signal on the wireless channel in accordance with the demodulator configuration based on receiving the grant.

A non-transitory computer-readable medium storing code for wireless communications at a UE is described. The code may include instructions executable by a processor to transmit, to a base station, at least one uplink signal corresponding to a condition of a wireless channel, receive, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal, and demodulate the multi-layer signal on the wireless channel in accordance with the demodulator configuration based on receiving the grant.

In some examples of the method, apparatuses, and non-transitory computer-readable medium described herein, receiving the grant may include operations, features, means, or instructions for receiving the grant indicating the demodulator configuration that indicates a demodulation search space corresponding to a number of layers included per layer group of the set of multiple layer groups of the multi-layer signal.

In some examples of the method, apparatuses, and non-transitory computer-readable medium described herein, receiving the grant may include operations, features, means, or instructions for receiving the grant indicating the demodulator configuration that corresponds to an amount of cross correlation determined between respective layers of a set of multiple layers of the set of multiple layer groups on the wireless channel.

In some examples of the method, apparatuses, and non-transitory computer-readable medium described herein, receiving the grant may include operations, features, means, or instructions for receiving the grant indicating the set of multiple layer groups within the multi-layer signal.

In some examples of the method, apparatuses, and non-transitory computer-readable medium described herein, transmitting the at least one uplink signal may include operations, features, means, or instructions for transmitting the at least one uplink signal including an indication of demodulator capabilities indicating a number of layers that a demodulator of the UE may be capable of jointly demodulating.

In some examples of the method, apparatuses, and non-transitory computer-readable medium described herein, a number of layers per layer group of the set of multiple layer groups, a number of layers for the multi-layer signal, or a combination thereof may be based on the indication of the demodulator capabilities.

In some examples of the method, apparatuses, and non-transitory computer-readable medium described herein, the demodulator configuration may be based on the indication of the demodulator capabilities.

In some examples of the method, apparatuses, and non-transitory computer-readable medium described herein, transmitting the at least one uplink signal may include operations, features, means, or instructions for transmitting the at least one uplink signal including channel state information, one or more sounding reference signals, an indication of one or more capabilities of the UE, an indication of types of precoding supported at the UE, or a combination thereof.

In some examples of the method, apparatuses, and non-transitory computer-readable medium described herein, the set of multiple demodulation schemes includes a maximum likelihood demodulation scheme, a near maximum likelihood demodulation scheme, a minimum mean square error demodulation scheme, or a combination thereof.

In some examples of the method, apparatuses, and non-transitory computer-readable medium described herein, each layer group of the set of multiple layer groups of the multi-layer signal include one or more layers.

A method for wireless communications at a base station is described. The method may include receiving, from a UE, at least one uplink signal corresponding to a condition of a wireless channel, transmitting, in response to the at least one uplink signal, a grant to the UE scheduling transmission of a multi-layer signal and indicating a demodulator configuration identifying a respective layer-specific demodulation scheme of a set of multiple demodulation schemes to apply for demodulating one or more layer groups of a set of multiple layer groups of the multi-layer signal, precoding first data for transmission on multiple layers of the multi-layer signal in a first layer group of the set of multiple layer groups based on the demodulator configuration, precoding second data for transmission on at least one layer of the multi-layer signal of a second layer group of the set of multiple layer groups based on the demodulator configuration, and transmitting, to the UE, the first precoded data of the multi-layer signal via the first layer group and the second precoded data of the multi-layer signal via the second layer group.

An apparatus for wireless communications at a base station is described. The apparatus may include a processor, memory coupled with the processor, and instructions stored in the memory. The instructions may be executable by the processor to cause the apparatus to receive, from a UE, at least one uplink signal corresponding to a condition of a wireless channel, transmit, in response to the at least one uplink signal, a grant to the UE scheduling transmission of a multi-layer signal and indicating a demodulator configuration identifying a respective layer-specific demodulation scheme of a set of multiple demodulation schemes to apply for demodulating one or more layer groups of a set of multiple layer groups of the multi-layer signal, precode first data for transmission on multiple layers of the multi-layer signal in a first layer group of the set of multiple layer groups based on the demodulator configuration, precode second data for transmission on at least one layer of the multi-layer signal of a second layer group of the set of multiple layer groups based on the demodulator configuration, and transmit, to the UE, the first precoded data of the multi-layer signal via the first layer group and the second precoded data of the multi-layer signal via the second layer group.

Another apparatus for wireless communications at a base station is described. The apparatus may include means for receiving, from a UE, at least one uplink signal corresponding to a condition of a wireless channel, means for transmitting, in response to the at least one uplink signal, a grant to the UE scheduling transmission of a multi-layer signal and indicating a demodulator configuration identifying a respective layer-specific demodulation scheme of a set of multiple demodulation schemes to apply for demodulating one or more layer groups of a set of multiple layer groups of the multi-layer signal, means for precoding first data for transmission on multiple layers of the multi-layer signal in a first layer group of the set of multiple layer groups based on the demodulator configuration, means for precoding second data for transmission on at least one layer of the multi-layer signal of a second layer group of the set of multiple layer groups based on the demodulator configuration, and means for transmitting, to the UE, the first precoded data of the multi-layer signal via the first layer group and the second precoded data of the multi-layer signal via the second layer group.

A non-transitory computer-readable medium storing code for wireless communications at a base station is described. The code may include instructions executable by a processor to receive, from a UE, at least one uplink signal corresponding to a condition of a wireless channel, transmit, in response to the at least one uplink signal, a grant to the UE scheduling transmission of a multi-layer signal and indicating a demodulator configuration identifying a respective layer-specific demodulation scheme of a set of multiple demodulation schemes to apply for demodulating one or more layer groups of a set of multiple layer groups of the multi-layer signal, precode first data for transmission on multiple layers of the multi-layer signal in a first layer group of the set of multiple layer groups based on the demodulator configuration, precode second data for transmission on at least one layer of the multi-layer signal of a second layer group of the set of multiple layer groups based on the demodulator configuration, and transmit, to the UE, the first precoded data of the multi-layer signal via the first layer group and the second precoded data of the multi-layer signal via the second layer group.

In some examples of the method, apparatuses, and non-transitory computer-readable medium described herein, transmitting the grant may include operations, features, means, or instructions for transmitting the grant indicating the demodulator configuration that indicates a demodulation search space corresponding to a number of layers included per layer group of the set of multiple layer groups of the multi-layer signal.

In some examples of the method, apparatuses, and non-transitory computer-readable medium described herein, transmitting the grant may include operations, features, means, or instructions for transmitting the grant indicating the demodulator configuration that corresponds to an amount of cross correlation determined between respective layers of a set of multiple layers of the set of multiple layer groups on the wireless channel.

In some examples of the method, apparatuses, and non-transitory computer-readable medium described herein, transmitting the grant may include operations, features, means, or instructions for transmitting the grant indicating the set of multiple layer groups within the multi-layer signal.

In some examples of the method, apparatuses, and non-transitory computer-readable medium described herein, receiving the at least one uplink signal may include operations, features, means, or instructions for receiving the at least one uplink signal including an indication of demodulator capabilities indicating a number of layers that a demodulator of the UE may be capable of jointly demodulating.

Some examples of the method, apparatuses, and non-transitory computer-readable medium described herein may include operations, features, means, or instructions for determining a number of layers per layer group of the set of multiple layer groups, a number of layers for the multi-layer signal, data included in the multi-layer signal, or a combination thereof based on the indication of the demodulator capabilities.

Some examples of the method, apparatuses, and non-transitory computer-readable medium described herein may include operations, features, means, or instructions for determining the demodulator configuration that suggests a number of layers of the multi-layer signal to jointly demodulate based on the indication of the demodulator capabilities.

In some examples of the method, apparatuses, and non-transitory computer-readable medium described herein, receiving the at least one uplink signal may include operations, features, means, or instructions for receiving the at least one uplink signal including channel state information, one or more sounding reference signals, an indication of one or more capabilities of the UE, an indication of types of precoding supported at the UE, or a combination thereof.

In some examples of the method, apparatuses, and non-transitory computer-readable medium described herein, precoding the first data, precoding the second data, or both may include operations, features, means, or instructions for precoding the first precoded data, the second precoded data, or both according to one or more precoding techniques that may be determined based on the at least one uplink signal.

In some examples of the method, apparatuses, and non-transitory computer-readable medium described herein, the one or more precoding techniques include a singular value decomposition precoding, a signal to leakage ratio precoding, or a combination thereof.

In some examples of the method, apparatuses, and non-transitory computer-readable medium described herein, the set of multiple demodulation schemes includes a maximum likelihood demodulation scheme, a near maximum likelihood demodulation scheme, a minimum mean square error demodulation scheme, or a combination thereof.

In some examples of the method, apparatuses, and non-transitory computer-readable medium described herein, each layer group of the set of multiple layer groups of the multi-layer signal include one or more layers.

DETAILED DESCRIPTION

Figure 1:
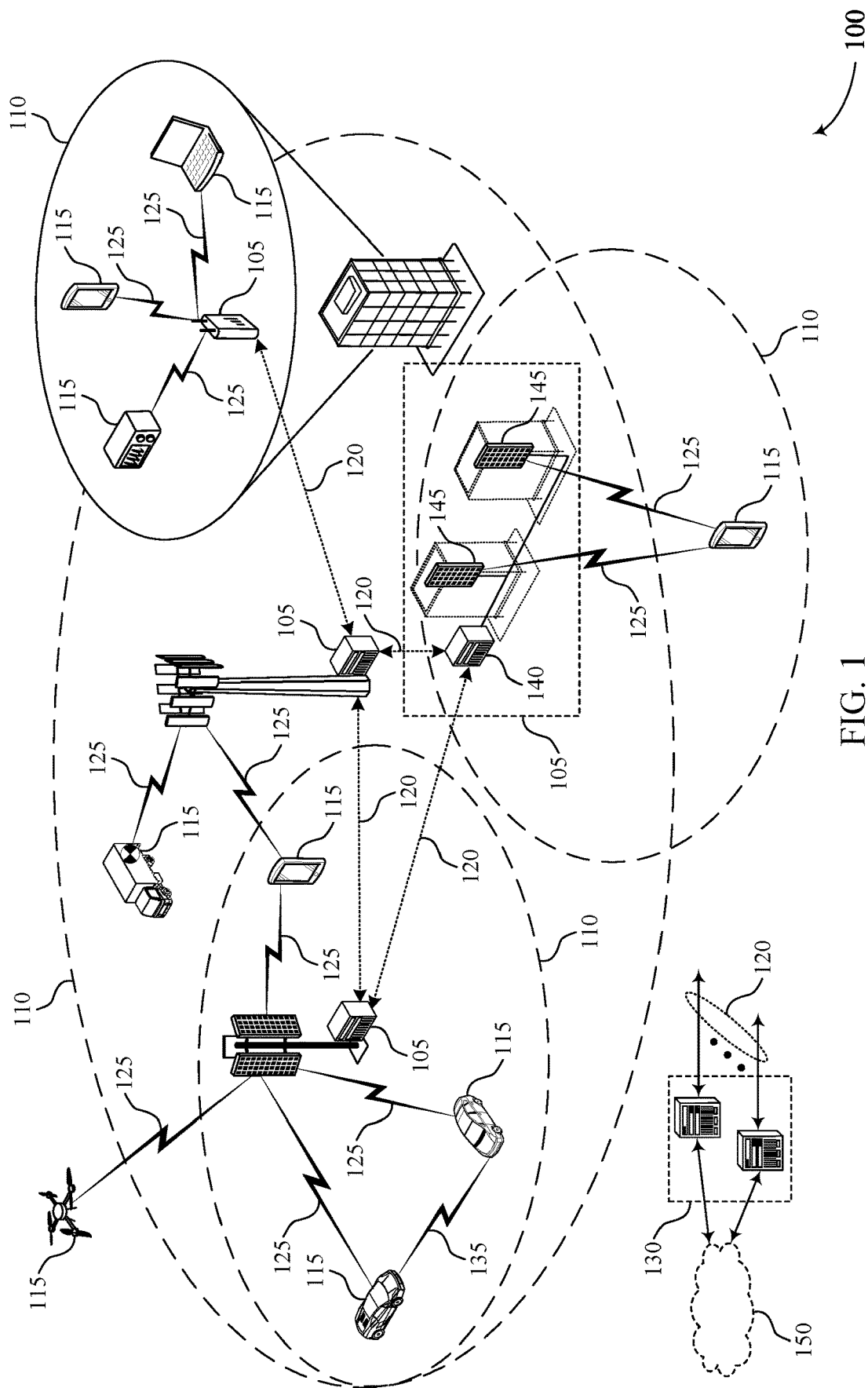
FIG. 1 illustrates an example of a wireless communications system that supports demodulator configuration based on user equipment (UE) signaling in accordance with aspects of the present disclosure.

In some examples, a base station may transmit downlink messages to a user equipment (UE), where the downlink messages contain multiple layers (e.g., virtual streams of information transmitted at a same time). To receive and process the information from each of the multiple layers, the UE may use a demodulator on the downlink messages. In some cases, the UE may monitor channel conditions and perform calculations to determine a demodulator scheme to apply for demodulating a precoded transmission that contains multiple layers (e.g., a multi-layer transmission or multi-layer signal) received from the base station. That is, the UE may independently determine which demodulator scheme to apply, and the base station may not affect or indicate the demodulator scheme. However, having the demodulator configuration be determined at the UE may be inefficient based on the UE expending power to perform the calculations to determine the demodulator configuration. Additionally, the base station may be unaware of demodulation capabilities at the UE and may not appropriately precode data for transmission in accordance with those capabilities.

As described herein, a base station may dynamically configure a UE with a demodulator configuration for demodulating a multi-layer transmission based on feedback or reports transmitted by the UE (e.g., sounding reference signal (SRS) transmissions, UE channel state information (CSI) report(s), UE capabilities, precoding, etc.). For example, the base station may estimate channel conditions and cross correlation between layers based on the feedback/reports. The base station may use the estimated channel conditions and layer cross correlation information for precoding data for transmission in layer groups and for indicating which demodulation scheme the UE is to apply for demodulating the respective layer groups of the multi-layer transmission. In some examples, the base station may indicate which layers form a layer group that should be demodulated together by the UE using a particular demodulation scheme. Additionally, precoding of data for transmission via a particular layer group may enhance the ability of the UE to decode the layer group using the suggested demodulation scheme. In some examples, the UE may transmit its demodulation capabilities, such as a number of layers that the UE can simultaneously demodulate at a time, and the base station may use the capability information for instructing which demodulation scheme the UE is to apply when demodulating a particular layer group and which layers to precode together to form a layer group.

Aspects of the disclosure are initially described in the context of wireless communications systems. Additionally, aspects of the disclosure are illustrated through an additional wireless communications system, a demodulator configuration, and a process flow. Aspects of the disclosure are further illustrated by and described with reference to apparatus diagrams, system diagrams, and flowcharts that relate to demodulator configuration based on UE signaling.

FIG. 1 illustrates an example of a wireless communications system 100 that supports a demodulator configuration based on UE signaling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may transmit downlink messages to a UE 115, where the downlink messages contain multiple layers (e.g., multiple virtual streams of information transmitted at a same time). To receive and process the information from each of the multiple layers, the UE 115 may use a demodulator on the downlink messages. For example, when a transmission includes multiple layers, a UE receiver may use a near maximum likelihood (ML) demodulator to process the multiple layers. The UE receiver may use the near ML demodulator based on a balance between complexity and performance afforded by the near ML demodulator compared to more complex ML demodulators. In some examples, ML demodulation may include the UE receiver going through all possibilities for demodulating a transmission and determining which possibility is the most likely for demodulating the transmission.

Depending on a situation for which the near ML demodulator is used (e.g., channel estimation, precoding, etc.), a complexity of the near ML demodulator may depend on a layer search space (e.g., a number of layers that are monitored for and processed together). For example, a simplest version of a minimum mean square error (MMSE) demodulator may consider a single layer at a time (e.g., the MMSE demodulator neglects any cross correlation between layers). If there is no cross correlation between layers, the use of the MMSE demodulator may be a beneficial solution (e.g., an optimal ML solution) because each layer would be processed individually based on the absence of the cross correlation between layers. Additionally or alternatively, if there is cross correlation between layers (e.g., multiple layers include similar transmission properties or include similar data), a UE 115 may use a more complex ML demodulator to more efficiently process those layers that do have cross correlation together (e.g., rather than each layer individually). Accordingly, the near ML demodulator complexity may depend on layer search space (e.g., depending on the channel).

In some cases, the UE 115 may determine a configuration for which demodulator to use for processing a received multi-layer transmission. For example, the UE 115 may determine a presence of cross correlation between layers of the multi-layer transmission or may receive an indication of cross correlation between the layers of the multi-layer transmission, and the UE 115 may then determine an efficient configuration for processing the multi-layer transmission based on this cross correlation. That is, the UE 115 may independently determine which demodulator configuration to apply, and other devices (e.g., a base station 105, network devices, additional UEs 115, etc.) may not affect or indicate the demodulator configuration. However, to determine this cross correlation and/or to determine the demodulator configuration, the UE 115 may perform different calculations, which may unnecessarily expend power at the UE 115 and affect battery life of the UE 115.

Wireless communications system 100 may support efficient techniques for a base station 105 to indicate or suggest a demodulator configuration for a UE 115 to use for processing multi-layer downlink message, signal, or transmission received from the base station 105. For example, the base station 105 may have knowledge of an expected channel the UE 115 observes based on different uplink signals and messages the UE 115 transmits to the base station 105, such as SRS transmissions, CSI reports, UE capabilities, precoding supported by the UE 115, etc.

Accordingly, the base station 105 may perform the determination of which demodulator configuration the UE 115 is to use based on this information about the channel from the UE 115, thereby saving processing power and battery life at the UE 115. In some examples, based on the indicated or suggested demodulator configuration, the base station 105 may suggest demodulator layer search spaces for the UE 115 to monitor and process. For example, the demodulator configuration may indicate which layers form a layer group that should be demodulated together by the UE 115 using a particular demodulation scheme or configuration. In some examples, the UE 115 may transmit its demodulation capabilities, such as a number of layers that the UE 115 can simultaneously demodulate at a time, and the base station 105 may use the capability information for instructing which demodulation scheme the UE 115 is to apply when demodulating a particular layer group and which layers are precoded together to form a layer group.

Figure 2:
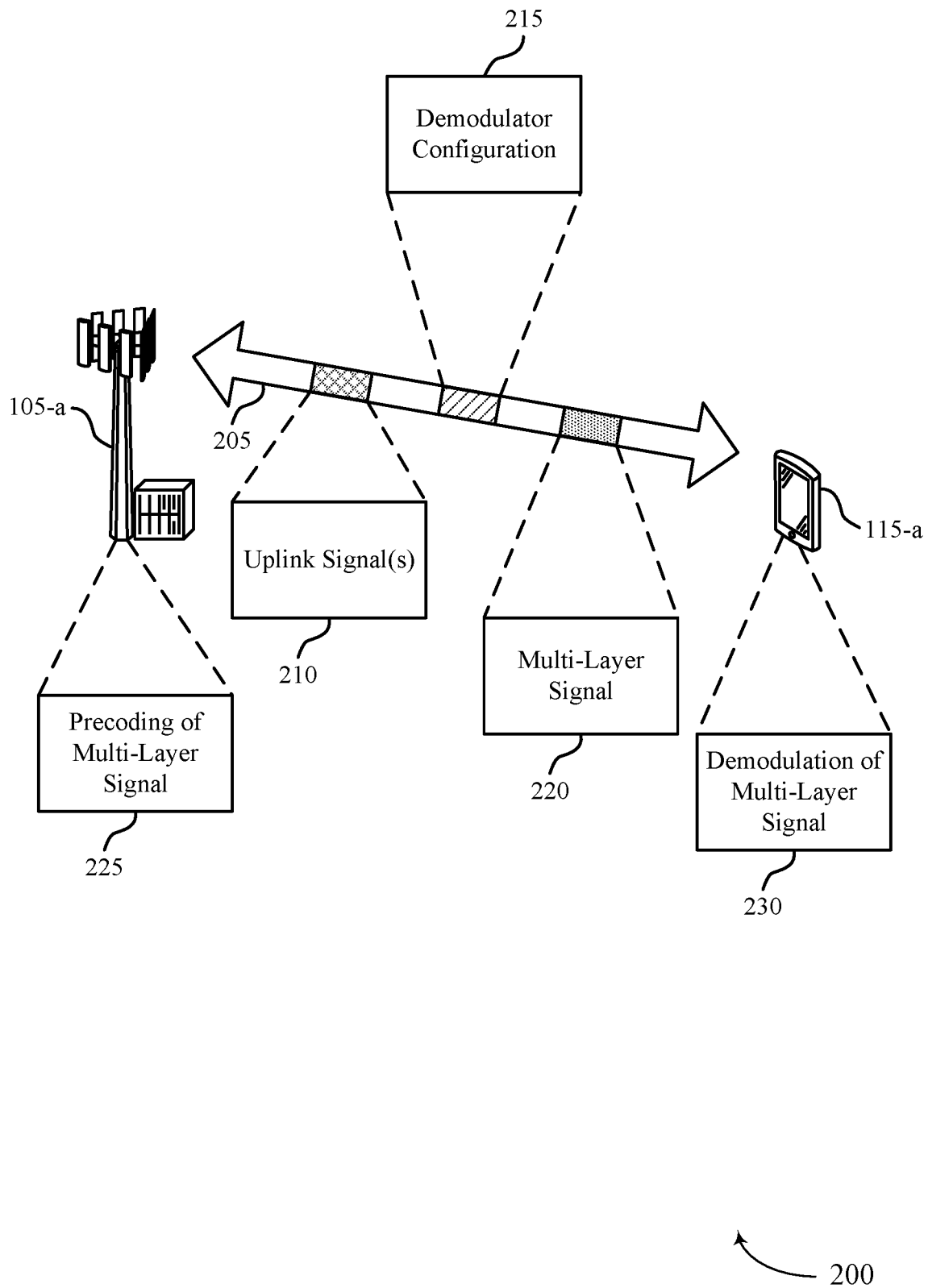
FIG. 2 illustrates an example of a wireless communications system that supports a demodulator configuration based on UE signaling in accordance with aspects of the present disclosure.

FIG. 2 illustrates an example of a wireless communications system 200 that supports a demodulator configuration based on UE signaling in accordance with aspects of the present disclosure. In some examples, wireless communications system 200 may implement aspects of or may be implemented by aspects of wireless communications system 100. For example, wireless communications system 200 may include a base station 105-*a* and a UE 115-*a*, which may represent examples of corresponding base stations 105 and UEs 115, respectively, as described with reference to FIG. 1. Additionally, base station 105-*a* and UE 115-*a* may communicate control information, data, or both using resources of a carrier 205.

As part of communicating with base station 105-*a*, UE 115-*a* may be configured to transmit one or more uplink signals 210 to base station 105-*a* that indicate conditions of a channel used for the communications via carrier 205. For example, the one or more uplink signals 210 may include SRS transmissions, CSI reports, UE capabilities, precoding supported by UE 115-*a*, etc. In some examples, after receiving the one or more uplink signals 210, base station 105-*a* may determine to adjust different transmission parameters to promote more efficient communications with UE 115-*a* based on the channel conditions indicated by the one or more uplink signals 210.

As described herein, after receiving the one or more uplink signals 210, base station 105-*a* may determine and indicate a demodulator configuration 215 for UE 115-*a* to use for demodulating, processing, and receiving a multi-layer signal 220 transmitted from base station 105-*a* to UE 115-*a*. For example, using the one or more uplink signals 210 that indicate the channel conditions, base station 105-*a* may estimate an expected UE degradation from a non-ML demodulator for processing multi-layer signal 220 and may suggest a least complex demodulation scheme that results in multi-layer signal 220 being successfully decoded at UE 115-*a* (e.g., a receiver). In some examples, with demodulator configuration 215, base station 105-*a* may transmit an indication of layer groups within multi-layer signals 220 that should be demodulated together at UE 115-*a*, and which demodulation scheme the UE 115-*a* is to apply to demodulate the one or more layers of a respective layer group.

Additionally, base station 105-*a* may adjust its precoding according to demodulator configuration 215 indicated to UE 115-*a*. For example, base station 105-*a* may perform a precoding 225 of multi-layer signal 220 that would result in optimized results for processing multi-layer signal 220 at UE 115-*a* assuming that UE 115-*a* uses demodulator configuration 215. In some examples, precoding 225 performed by base station 105-*a* may include a singular value decomposition (SVD) precoding, a signal to leakage ratio (SLR) precoding, or a combination thereof. Additionally, precoding 225 may include base station 105-*a* combining different layers together of multi-layer signal 220 prior to transmission. As described herein, in some examples, base station 105-*a* may determine the number of layers that are combined for precoding 225 of multi-layer signal 220 based on the one or more uplink signals 210 received from UE 115-*a*. The precoding performed by base station 105-*a* in accordance with an indicated demodulator configuration as described herein is discussed in greater detail with reference to FIG. 3.

As an example, if base station 105-*a* is estimating a diagonal R matrix after a QR decomposition (e.g., no cross correlation between layers) for a demodulation 230 of multi-layer signal 220 performed by UE 115-*a* according to demodulator configuration 215, base station 105-*a* may recommend for UE 115-*a* to use a demodulation scheme (e.g., an MMSE demodulator) to process multi-layer signal 220 and perform demodulation 230. The MMSE demodulator may be a simple demodulator scheme that is desired or optimal to be used by UE 115-*a* when there is no cross correlation between the layers. Additionally or alternatively, if base station 105-*a* is estimating strong correlation between two (2) layers of multi-layer signal 220 but low correlation between other layers of multi-layer signal 220, base station 105-*a* may suggest as first demodulation scheme (e.g., a 2×2 demodulator) for those two (2) layers and a second, different demodulation scheme for the other layers (e.g., an MMSE demodulator).

Additionally or alternatively, assuming multi-layer signal 220 includes eight (8) layers with a strong correlation between four (4) of the layers (e.g., with a low correlation between those four (4) layers and the remaining layers of multi-layer signal 220), a strong correlation between another two (2) layers, and no correlation for the remaining two (2) layers with the other layers, base station 105-*a* may estimate the correlation and may suggest for UE 115-*a* to use a particular layer-specific demodulation scheme for demodulating a respective layer group of the multi-layer signal 220, such as a 4×4 demodulator for the four (4) correlated layers, a 2×2 demodulator for the two (2) correlated layers, and an MMSE demodulator for the two (2) uncorrelated layers. These examples of demodulator configuration 215 may not represent an exhaustive list of possible demodulator configurations for enabling UE 115-*a* to receive and process multi-layer signal 220, and base station 105-*a* may suggest or indicate additional demodulator configurations and schemes not listed herein.

In some examples, as part of the one or more uplink signals 210 or in addition to the one or more uplink signals 210, UE 115-*a* may transmit a near ML layers capability report (e.g., an indication of demodulator capabilities) to improve the determination or decision of base station 105-*a* for demodulator configuration 215. For example, UE 115-*a* may report to base station 105-*a* its near ML capabilities, such as a size of a demodulator UE 115-*a* can perform (e.g., what size matrix is supported for demodulation), a number of layers that UE 115-*a* can process together at a given time, additional information about the types of demodulation that UE 115-*a* supports, or a combination thereof. In some examples, a maximum number of layers that UE 115-*a* is capable of processing at a given time may correspond to a minimum number of antenna elements (e.g., physical antenna elements) on a side of UE 115-*a*.

For example, UE 115-*a* may indicate to base station 105-*a* that UE 115-*a* is capable of performing or using different types or sizes of demodulators (e.g., a 1×1, a 2×2, or a 4×4 demodulator even if there are eight (8) layers). In some examples, to indicate its near ML capabilities, UE 115-*a* may report different values according to an equation, such as $\log_2$(Near ML Layers Capabilities). For example, if UE 115-*a* reports a '0' (e.g., corresponding to $\log_2(1)=0$), UE 115-*a* may indicate that UE 115-*a* is capable of performing or using a first size of demodulator (e.g., a 1×1 demodulator, such as an MMSE demodulator). Additionally or alternatively, if UE 115-*a* reports '1' (e.g., corresponding to $\log_2(2)=1$)), UE 115-*a* may indicate that UE 115-*a* is capable of performing or using a second size of demodulator (e.g., a 2×2 demodulator). Additionally or alternatively, if UE 115-*a* reports a '2' (e.g., corresponding to $\log_2(4)=2$)), UE 115-*a* may indicate that UE 115-*a* is capable of performing or using a third size of demodulator (e.g., a 4×4 demodulator).

In some examples, UE 115-*a* may report its near ML capabilities by reporting a single value as described previously (e.g., '0' indicates a first demodulator capability, '1' indicates a second demodulator capability, etc.). Additionally or alternatively, UE 115-*a* may report a value that corresponds to an index of a defined table known to UE 115-*a*, where the index indicates a row of the defined table and corresponding defined near ML capabilities. In some examples, base station 105-*a* may transmit an indication of a table that includes different near ML capability possibilities for UE 115-*a* to report (e.g., via a value that corresponds to an index of the table). For example, base station 105-*a* may transmit the indication of the table to UE 115-*a* via RRC signaling, and UE 115-*a* may indicate an entry of the table corresponding to its near ML capabilities for base station 105-*a* to then transmit demodulator configuration 215 to UE 115-*a* based on the indicated near ML capabilities from the table.

That is, if UE 115-*a* reports its near ML capabilities, base station 105-*a* may take the near ML capabilities of UE 115-*a* into account when determining and indicating demodulator configuration 215 to UE 115-*a*. In some examples, the near ML capabilities of UE 115-*a* may influence a decision of a number of layers that base station 105-*a* uses when transmitting multi-layer signal 220 to UE 115-*a* (e.g., base station 105-*a* takes the near ML capabilities into account when determining how many layers should be used for the multi-layer transmission and when suggesting to UE 115-*a* how to demodulate the number of layers chosen to be used). For example, base station 105-*a* may take the near ML capabilities of UE 115-*a* into account when deciding on how many layers should be used for multi-layer signal 220 (e.g., base station 105-*a* decides what to transmit based on the near ML capabilities) and when base station 105-*a* suggests to UE 115-*a* how to demodulate the number of layers base station 105-*a* has chosen to use for multi-layer signal 220 (e.g., base station 105-*a* can decide to suggest to UE 115-*a* to jointly demodulate less layers than the number of layers that was transmitted).

In some examples, base station 105-*a* may still choose more layers for multi-layer signal 220 than a number of layers that UE 115-*a* supports as indicated with the near ML capabilities, and UE 115-*a* may be able to try and decode the higher number of layers (e.g., but performance may be degraded compared to an ML demodulator or a demodulator that uses full layers). Additionally or alternatively, base station 105-*a* may decide on a more suitable precoding for multi-layer signal 220 based on the near ML capabilities of UE 115-*a*, which may improve performance of UE 115-*a* receiving and processing multi-layer signal 220.

By using the techniques described herein, communications between base station 105-*a* and UE 115-*a* may experience a higher spectral efficiency, and UE 115-*a* may experience power savings. For example, for achieving the higher spectral efficiency, base station 105-*a* may perform calculations and adjust demodulator configuration 215 according to reports and feedback from UE 115-*a* (e.g., including near ML layers capability) rather than UE 115-*a* determining demodulator configuration 215 (e.g., which may be based on imperfect channel knowledge). Additionally, UE 115-*a* may experience the power savings based on the demodulator configuration calculations being performed at base station 105-*a* and no additional calculations being performed at UE 115-*a*.

Figure 3:
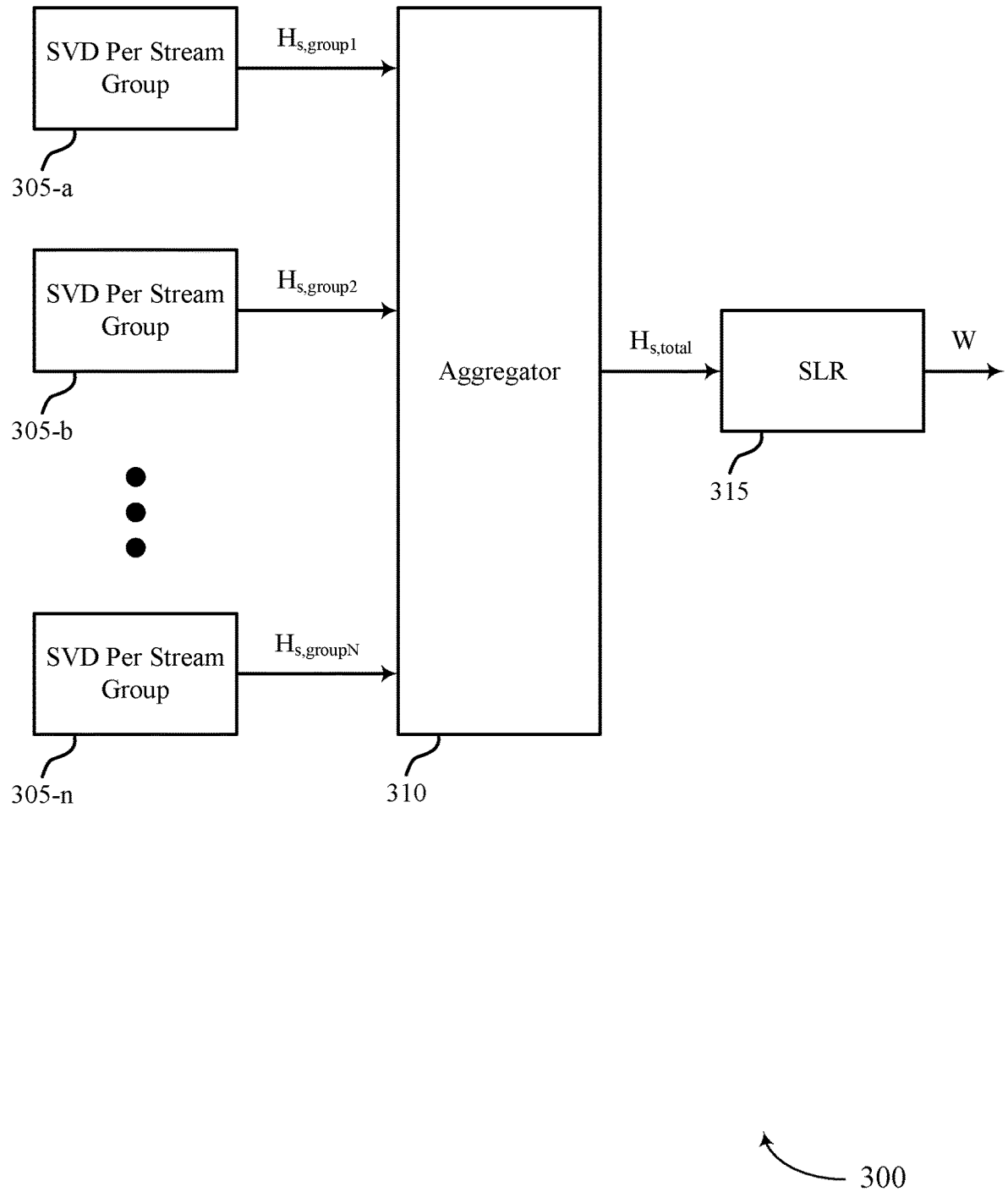
FIG. 3 illustrates an example of a precoding configuration in accordance with aspects of the present disclosure.

FIG. 3 illustrates an example of a precoding configuration 300 in accordance with aspects of the present disclosure. In some examples, precoding configuration 300 may implement aspects of or may be implemented by aspects of wireless communications system 100, wireless communications system 200, or both. For example, a base station 105 may use precoding configuration 300 when precoding a multi-layer transmission prior to transmitting the multi-layer transmission to a UE 115. As described herein, the base station 105 may precode the multi-layer transmission according to a demodulator configuration that is determined by the base station 105 based on reports and feedback received from the UE 115 (e.g., including near ML capabilities of the UE 115). Additionally, the base station 105 may transmit a grant to the UE 115 that schedules the multi-layer transmission and indicates the demodulator configuration. Accordingly, the base station 105 may precode the multi-layer transmission based on the demodulator configuration such that UE 115 using the demodulator configuration to process the multi-layer transmission results in optimized results for processing the multi-layer transmission.

In some examples, the base station 105 may use different types of precoding for precoding the multi-layer transmission. A first type of precoding may include SVD precoding which may result in MMSE precoding to be desirable (e.g., optimal, ML) under an assumption of a MMSE demodulator being used at the UE 115. SVD precoding may result in a channel estimation error which might cause the MMSE demodulator to suffer from significant degradation, such that a more complex demodulator may be used by the UE 115. A second type of precoding may include SLR precoding that is used to reduce or minimize cross UE interference in multi-user systems by spatial nulling.

As described herein, the base station 105 may adjust its precoding for the multi-layer transmission based on precoding configuration 300 such that the base station 105 uses an SVD 305 per layer group and an SLR 315. For example, the base station 105 may use multiple SVDs 305 (e.g., per stream group for a single UE 115) followed by SLR 315 for inter-stream-group interference reduction, to allow the UE 115 to use a smaller space demodulator without suffering from cross layer group interference. As shown in the example of FIG. 3, the base station 105 may use n SVDs 305 (e.g., a first SVD 305-*a*, a second SVD 305-*b*, etc. up to an n-th SVD 305-*n*) per stream group, where each SVD 305 corresponds to a respective precoded portion of the multi-layer transmission (e.g., a $H_{s,group1}$ for the first SVD 305-*a*, a $H_{s,group2}$ for the second SVD 305-*b*, a $H_{s,groupN}$ for the n-th SVD 305-*n*, etc.). The base station 105 may then use an aggregator 310 to aggregate the groups to generate a full precoded version of the multi-layer transmission (e.g., $H_{s,total}$). The base station 105 may then use SLR 315 to further precode the multi-layer transmission and for inter-stream interference reduction, such that the precoded multi-layer transmission is given by W, and subsequently transmits the multi-layer transmission to the UE 115.

Equations 1 and 2 may be used by the base station 105 when precoding the multi-layer transmission according to precoding configuration 300, where i represents a row index such that xi is an i-th of a matrix X.

$$w_i = \operatorname{argmin}\left\{\frac{w_i^* \cdot h_i^* \cdot w_i \cdot h_i}{w_i^* \cdot (I + H^* \cdot H) \cdot w_i}\right\} \quad (1)$$

$$W_{SLR} = H^* \cdot (H \cdot H^* + I)^{-1} \quad (2)$$

Accordingly, based on precoding configuration 300, if the UE 115 (e.g., or an additional receiver) uses a per group demodulator (e.g., corresponding to a smaller layer space), the UE 115 may use a lower complexity demodulation while maintaining high performance and a more stable solution.

Figure 4:
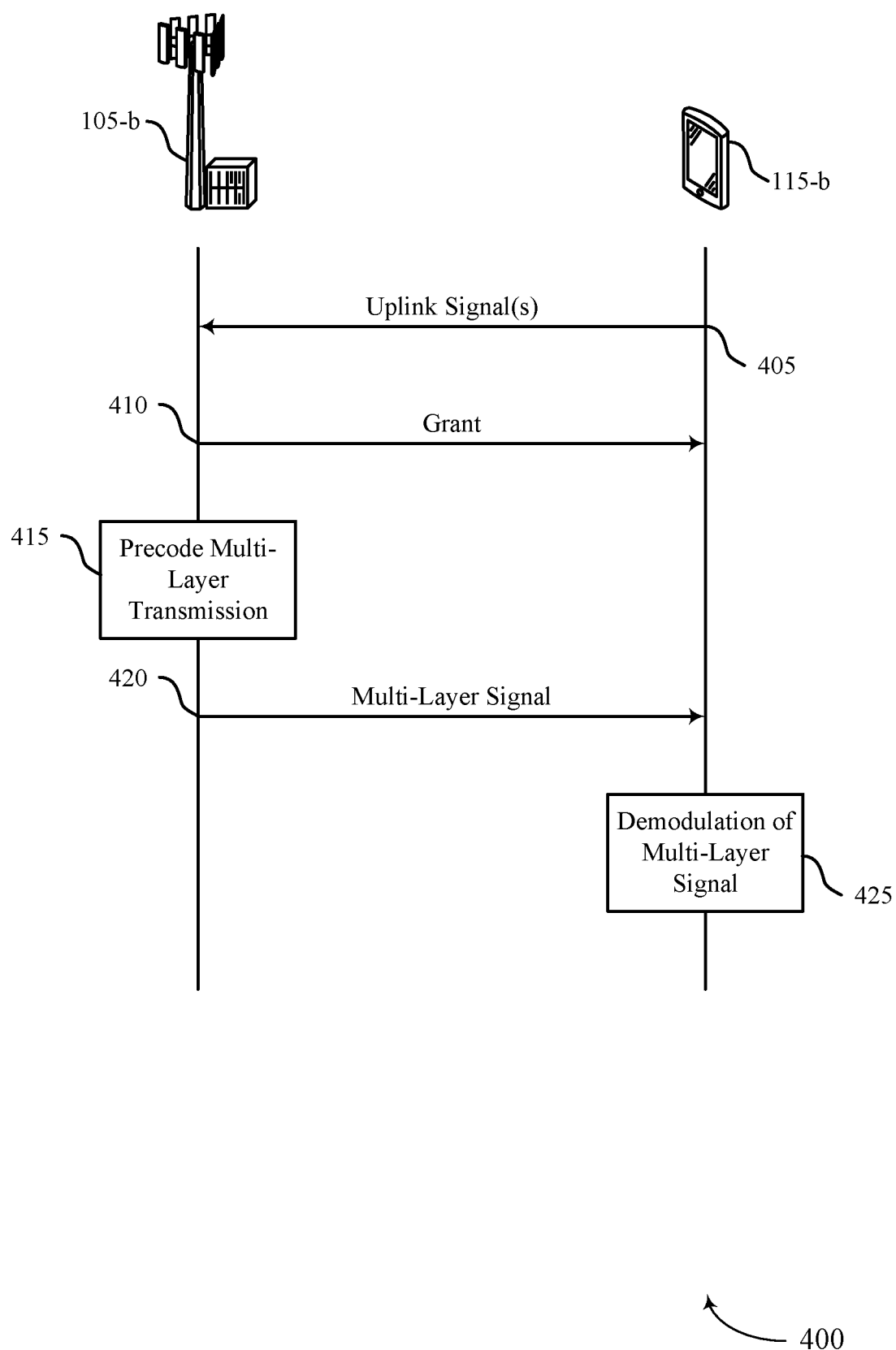
FIG. 4 illustrates an example of a process flow that supports a demodulator configuration based on UE signaling in accordance with aspects of the present disclosure.

FIG. 4 illustrates an example of a process flow 400 that supports a demodulator configuration based on UE signaling in accordance with aspects of the present disclosure. In some examples, process flow 400 may implement aspects of or may be implemented by aspects of wireless communications system 100, wireless communications system 200, or both. For example, process flow 400 may include a base station 105-*b* and a UE 115-*b*, which may represent examples of corresponding base stations 105 and UEs 115, respectively, as described with reference to FIGS. 1-3.

In the following description of process flow 400, the operations between UE 115-*b* and base station 105-*b* may be performed in different orders or at different times. Certain operations may also be left out of process flow 400, or other operations may be added to process flow 400. It is to be understood that while UE 115-*b* and base station 105-*b* are shown performing a number of the operations of process flow 400, any wireless device may perform the operations shown.

At 405, UE 115-*b* may transmit, to base station 105-*b*, at least one uplink signal corresponding to a condition of a wireless channel. For example, UE 115-*b* may transmit the at least one uplink signal including CSI, one or more SRSs, an indication of one or more capabilities of UE 115-*b*, an indication of types of precoding supported at UE 115-*b*, or a combination thereof. Additionally or alternatively, UE 115-*b* may transmit the at least one uplink signal including an indication of demodulator capabilities indicating a number of layers that a demodulator of UE 115-*b* is capable of jointly demodulating (e.g., 1×1, 2×2, 4×4, etc.). In some examples, base station 105-*b* may determine a number of layers per layer group of the set of layer groups, a number of layers for the multi-layer signal, data included in the multi-layer signal, or a combination thereof based on the indication of the demodulator capabilities. Additionally or alternatively, base station 105-*b* may determine the demodulator configuration that suggests a number of layers of the multi-layer signal for UE 115-*b* to jointly demodulate based on the indication of the demodulator capabilities.

At 410, UE 115-*b* may receive, in response to the at least one uplink signal, a grant from base station 105-*b* scheduling transmission of a multi-layer signal on the wireless channel and indicating a demodulator configuration identifying a respective layer-specific demodulation scheme of a set of demodulation schemes to apply for demodulating one or more layer groups of a set of layer groups of the multi-layer signal. For example, UE 115-b may receive the grant indicating the demodulator configuration that indicates a demodulation search space corresponding to a number of layers included per layer group of the set of layer groups of the multi-layer signal. Additionally or alternatively, UE 115-b may receive the grant indicating the demodulator configuration that corresponds to an amount of cross correlation determined between respective layers of a set of layers of the set of layer groups on the wireless channel. Additionally or alternatively, UE 115-b may receive the grant indicating the set of layer groups within the multi-layer signal.

In some examples, the set of demodulation schemes may include an ML demodulation scheme, a near ML demodulation scheme, an MMSE demodulation scheme, or a combination thereof. Additionally, each layer group of the set of layer groups may include one or more layers. In some examples, a number of layers per layer group of the set of layer groups, a number of layers for the multi-layer signal, or a combination thereof may be based on the indication of the demodulator capabilities. Additionally or alternatively, the demodulator configuration may be based on the indication of the demodulator capabilities.

At 415, base station 105-b may precode first data for transmission on multiple layers of the multi-layer signal in a first layer group of the set of layer groups based on the demodulator configuration. Additionally, base station 105-b may precode second data for transmission on at least one layer of the multi-layer signal of a second layer group of the set of layer groups based on the demodulator configuration. In some examples, base station 105-b may precode the first precoded data, the second precoded data, or both according to one or more precoding techniques that are determined based on the at least one uplink signal received at 405. For example, the one or more precoding techniques may include an SVD precoding, an SLR precoding, or a combination thereof.

At 420, base station 105-b may transmit, to UE 115-b, the first precoded data of the multi-layer signal via the first layer group and the second precoded data of the multi-layer signal via the second layer group. At 425, UE 115-b may demodulate the multi-layer signal on the wireless channel in accordance with the demodulator configuration based on receiving the grant at 410.

Figure 5:
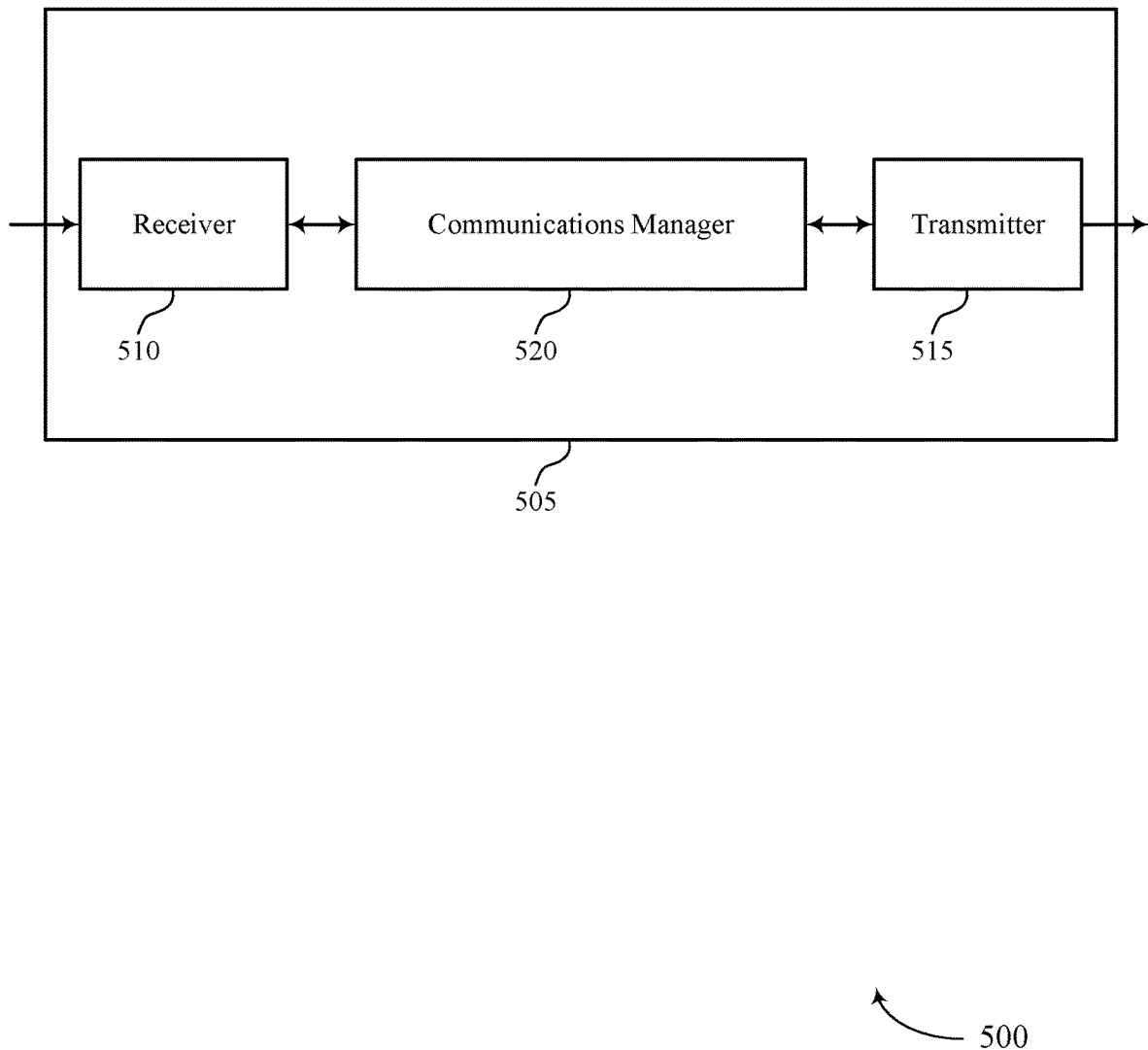
FIGS. 5 and 6 show block diagrams of devices that support a demodulator configuration based on UE signaling in accordance with aspects of the present disclosure.

FIG. 5 shows a block diagram 500 of a device 505 that supports a demodulator configuration based on UE signaling in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to a demodulator configuration based on UE signaling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to a demodulator configuration based on UE signaling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of a demodulator configuration based on UE signaling as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for transmitting, to a base station, at least one uplink signal corresponding to a condition of a wireless channel. The communications manager 520 may be configured as or otherwise support a means for receiving, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal. The communications manager 520 may be configured as or otherwise support a means for demodulating the multi-layer signal on the wireless channel in accordance with the demodulator configuration based on receiving the grant.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing and reduced power consumption. For example, the device 505 may reduce processing and power consumption using the techniques described herein based on receiving an indication of a demodulator configuration to use for processing a multi-layer signal rather than performing calculations and determining the demodulator configuration itself.

Figure 6:
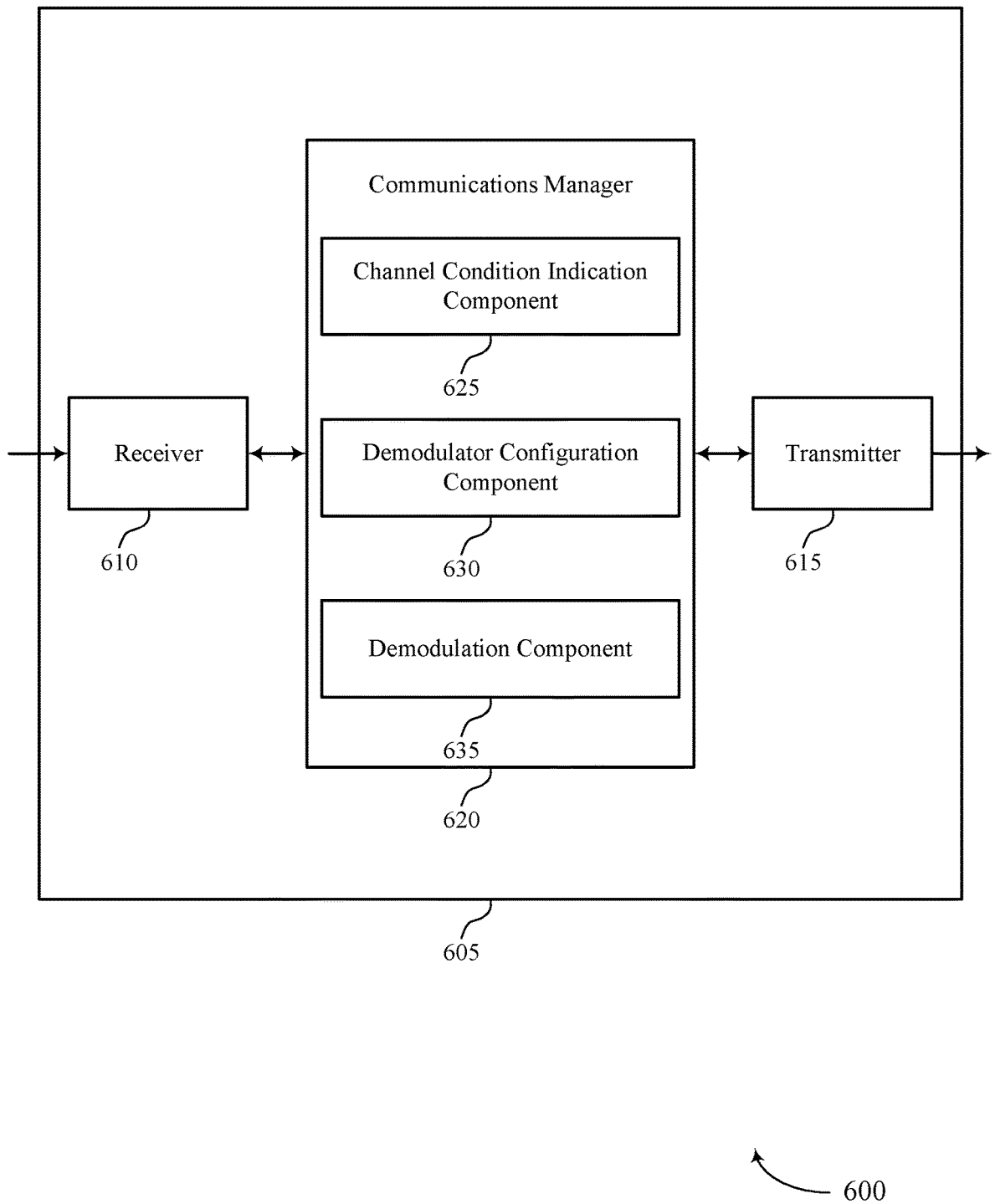

FIG. 6 shows a block diagram 600 of a device 605 that supports a demodulator configuration based on UE signaling in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to a demodulator configuration based on UE signaling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to a demodulator configuration based on UE signaling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of a demodulator configuration based on UE signaling as described herein. For example, the communications manager 620 may include a channel condition indication component 625, a demodulator configuration component 630, a demodulation component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The channel condition indication component 625 may be configured as or otherwise support a means for transmitting, to a base station, at least one uplink signal corresponding to a condition of a wireless channel. The demodulator configuration component 630 may be configured as or otherwise support a means for receiving, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal. The demodulation component 635 may be configured as or otherwise support a means for demodulating the multi-layer signal on the wireless channel in accordance with the demodulator configuration based on receiving the grant.

Figure 7:
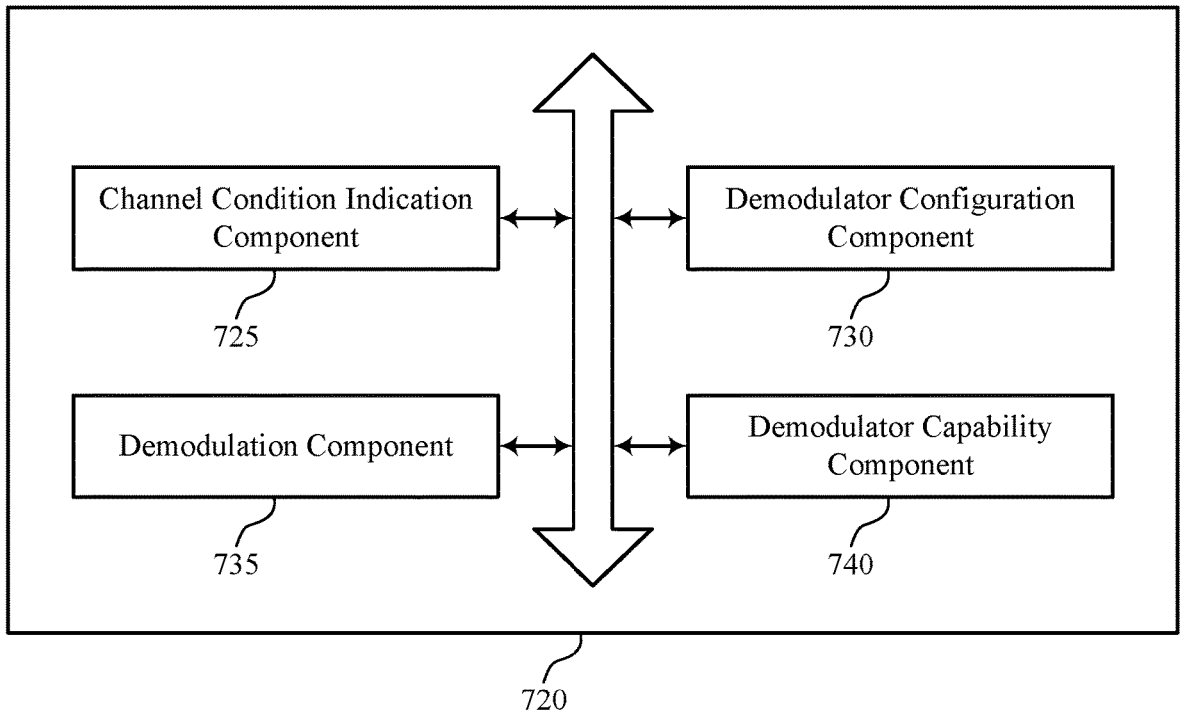
FIG. 7 shows a block diagram of a communications manager that supports a demodulator configuration based on UE signaling in accordance with aspects of the present disclosure.

FIG. 7 shows a block diagram 700 of a communications manager 720 that supports a demodulator configuration based on UE signaling in accordance with aspects of the present disclosure. The communications manager 720 may be an example of aspects of a communications manager 520, a communications manager 620, or both, as described herein. The communications manager 720, or various components thereof, may be an example of means for performing various aspects of a demodulator configuration based on UE signaling as described herein. For example, the communications manager 720 may include a channel condition indication component 725, a demodulator configuration component 730, a demodulation component 735, a demodulator capability component 740, or any combination thereof. Each of these components may communicate, directly or indirectly, with one another (e.g., via one or more buses).

The communications manager 720 may support wireless communications at a UE in accordance with examples as disclosed herein. The channel condition indication component 725 may be configured as or otherwise support a means for transmitting, to a base station, at least one uplink signal corresponding to a condition of a wireless channel. The demodulator configuration component 730 may be configured as or otherwise support a means for receiving, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal. The demodulation component 735 may be configured as or otherwise support a means for demodulating the multi-layer signal on the wireless channel in accordance with the demodulator configuration based on receiving the grant.

In some examples, to support receiving the grant, the demodulator configuration component 730 may be configured as or otherwise support a means for receiving the grant indicating the demodulator configuration that indicates a demodulation search space corresponding to a number of layers included per layer group of the set of multiple layer groups of the multi-layer signal.

In some examples, to support receiving the grant, the demodulator configuration component 730 may be configured as or otherwise support a means for receiving the grant indicating the demodulator configuration that corresponds to an amount of cross correlation determined between respective layers of a set of multiple layers of the set of multiple layer groups on the wireless channel.

In some examples, to support receiving the grant, the demodulator configuration component 730 may be configured as or otherwise support a means for receiving the grant indicating the set of multiple layer groups within the multi-layer signal.

In some examples, to support transmitting the at least one uplink signal, the demodulator capability component 740 may be configured as or otherwise support a means for transmitting the at least one uplink signal including an indication of demodulator capabilities indicating a number of layers that a demodulator of the UE is capable of jointly demodulating.

In some examples, the demodulator capability component 740 may be configured as or otherwise support a means for determining a number of layers per layer group of the set of multiple layer groups, a number of layers for the multi-layer signal, data included in the multi-layer signal, or a combination thereof based on the indication of the demodulator capabilities.

In some examples, the demodulator capability component 740 may be configured as or otherwise support a means for determining the demodulator configuration that suggests a number of layers of the multi-layer signal to jointly demodulate based on the indication of the demodulator capabilities.

In some examples, to support transmitting the at least one uplink signal, the channel condition indication component 725 may be configured as or otherwise support a means for transmitting the at least one uplink signal including channel state information, one or more sounding reference signals, an indication of one or more capabilities of the UE, an indication of types of precoding supported at the UE, or a combination thereof.

In some examples, the set of multiple demodulation schemes includes a maximum likelihood demodulation scheme, a near maximum likelihood demodulation scheme, a minimum mean square error demodulation scheme, or a combination thereof.

In some examples, each layer group of the set of multiple layer groups of the multi-layer signal include one or more layers.

Figure 8:
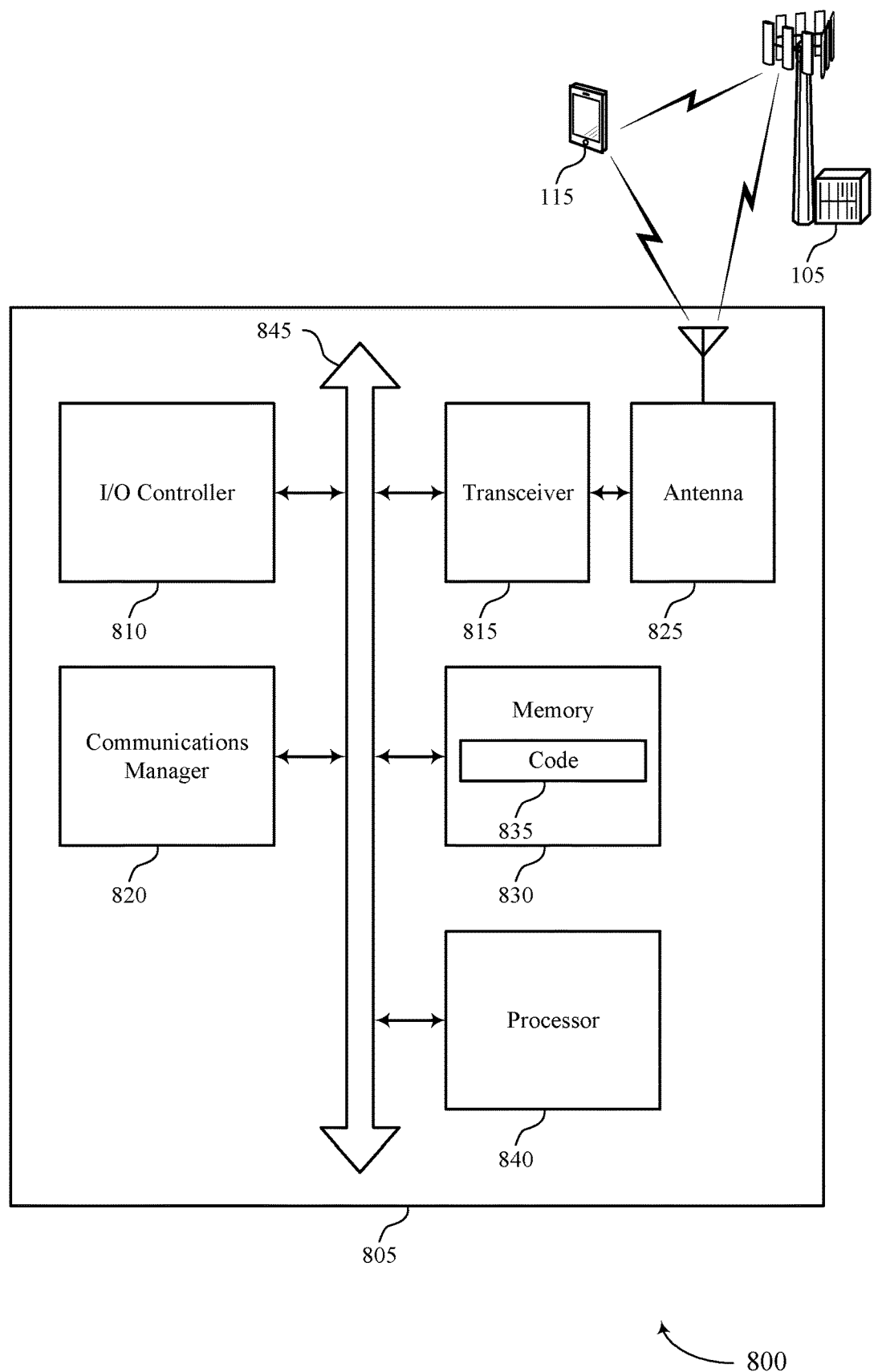
FIG. 8 shows a diagram of a system including a device that supports a demodulator configuration based on UE signaling in accordance with aspects of the present disclosure.

FIG. 8 shows a diagram of a system 800 including a device 805 that supports a demodulator configuration based on UE signaling in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting a demodulator configuration based on UE signaling). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting, to a base station, at least one uplink signal corresponding to a condition of a wireless channel. The communications manager 820 may be configured as or otherwise support a means for receiving, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal. The communications manager 820 may be configured as or otherwise support a means for demodulating the multi-layer signal on the wireless channel in accordance with the demodulator configuration based on receiving the grant.

By including or configuring the communications manager 820 in accordance with examples as described herein, the device 805 may support techniques for improved user experience related to reduced processing, reduced power consumption, and improved coordination between devices. For example, the device 805 may reduce processing and power consumption using the techniques described herein based on receiving an indication of a demodulator configuration to use for processing a multi-layer signal rather than performing calculations and determining the demodulator configuration itself.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of a demodulator configuration based on UE signaling as described herein, or the processor 840 and the memory 830 may be otherwise configured to perform or support such operations.

Figure 9:
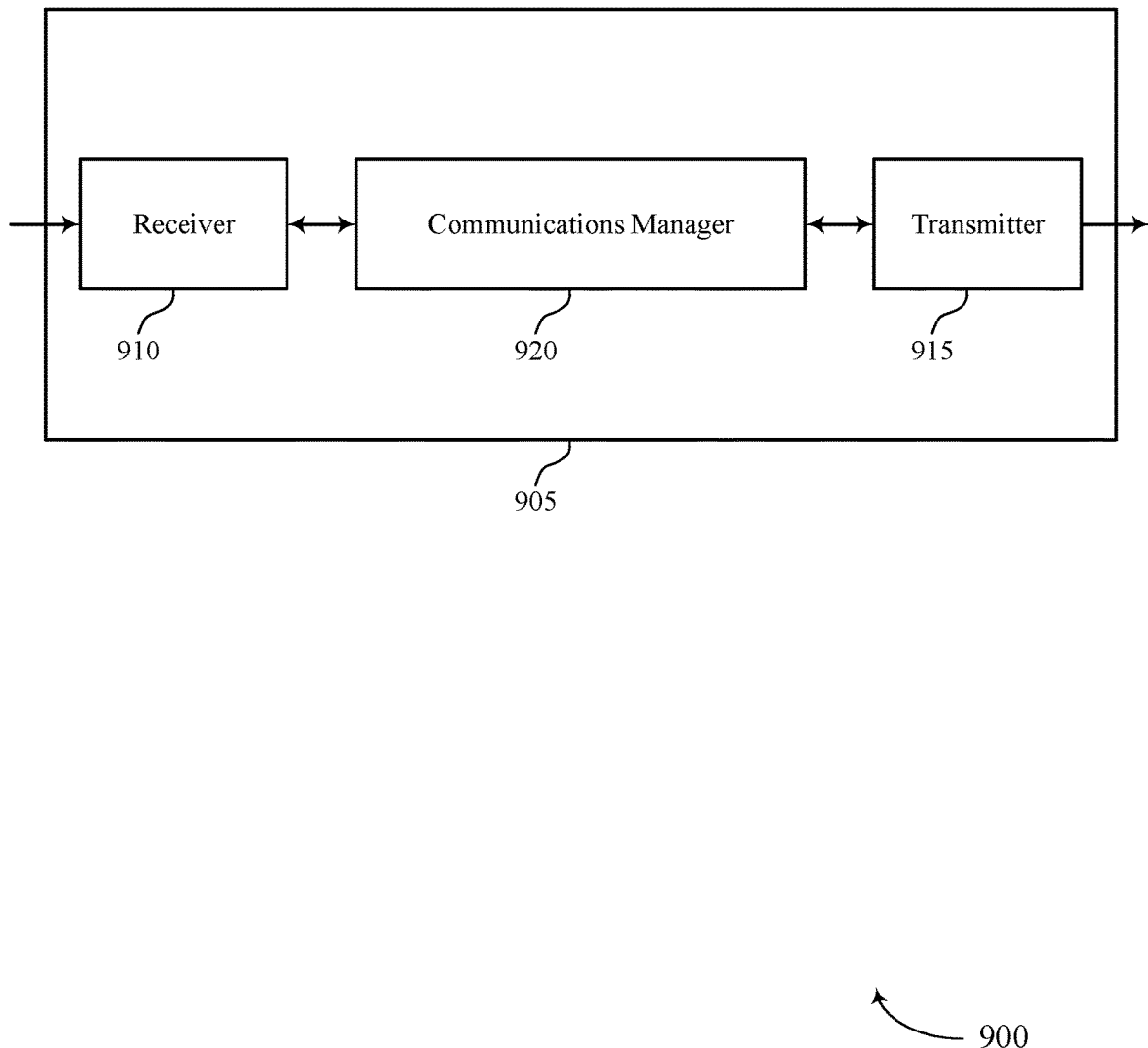
FIGS. 9 and 10 show block diagrams of devices that support a demodulator configuration based on UE signaling in accordance with aspects of the present disclosure.

FIG. 9 shows a block diagram 900 of a device 905 that supports a demodulator configuration based on UE signaling in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to a demodulator configuration based on UE signaling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a demodulator configuration based on UE signaling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of a demodulator configuration based on UE signaling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, at least one uplink signal corresponding to a condition of a wireless channel. The communications manager 920 may be configured as or otherwise support a means for transmitting, in response to the at least one uplink signal, a grant to the UE scheduling transmission of a multi-layer signal and indicating a demodulator configuration identifying a respective layer-specific demodulation scheme of a set of multiple demodulation schemes to apply for demodulating one or more layer groups of a set of multiple layer groups of the multi-layer signal. The communications manager 920 may be configured as or otherwise support a means for precoding first data for transmission on multiple layers of the multi-layer signal in a first layer group of the set of multiple layer groups based on the demodulator configuration. The communications manager 920 may be configured as or otherwise support a means for precoding second data for transmission on at least one layer of the multi-layer signal of a second layer group of the set of multiple layer groups based on the demodulator configuration. The communications manager 920 may be configured as or otherwise support a means for transmitting, to the UE, the first precoded data of the multi-layer signal via the first layer group and the second precoded data of the multi-layer signal via the second layer group.

Figure 10:
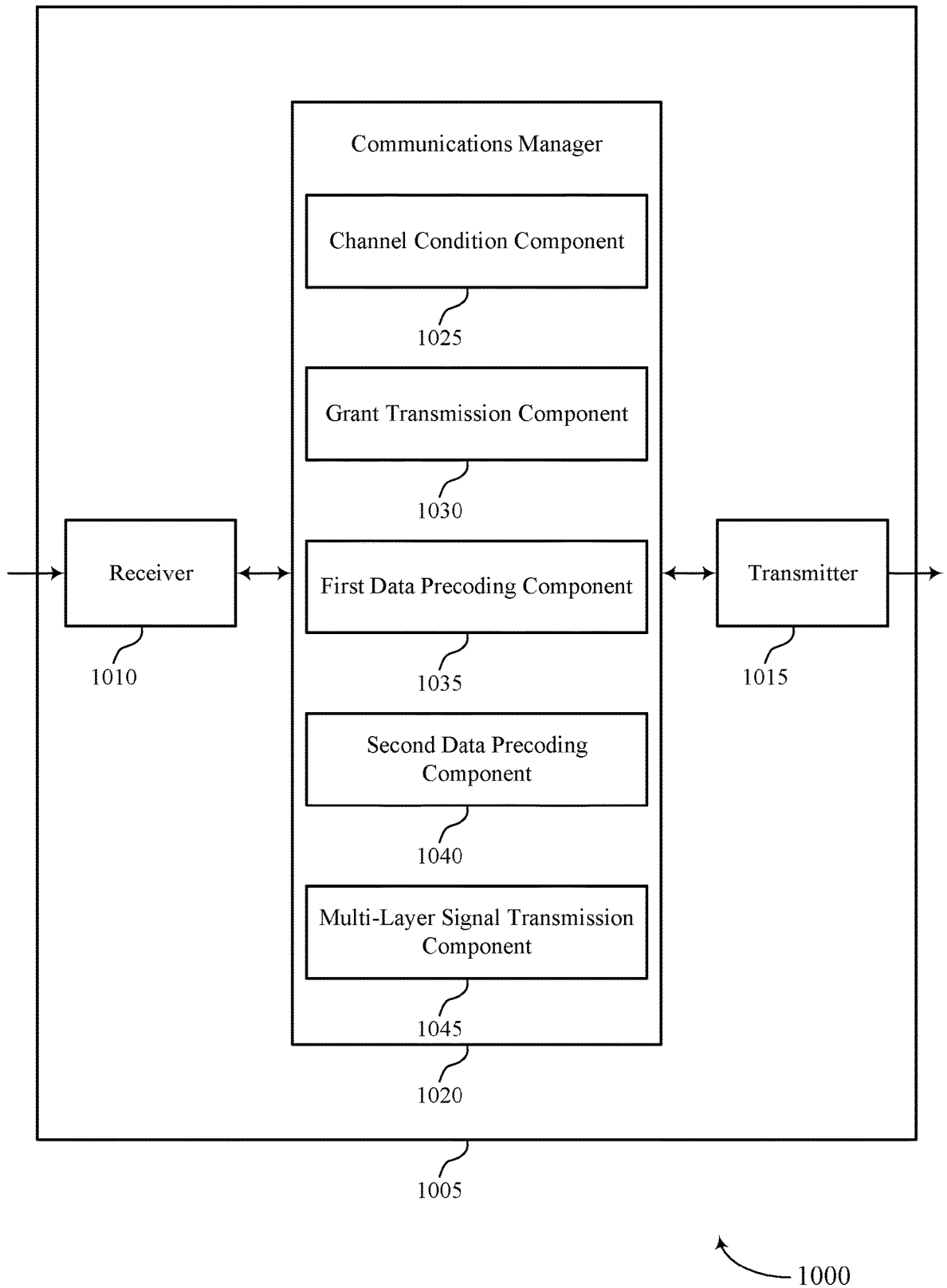

FIG. 10 shows a block diagram 1000 of a device 1005 that supports a demodulator configuration based on UE signaling in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to a demodulator configuration based on UE signaling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to a demodulator configuration based on UE signaling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of a demodulator configuration based on UE signaling as described herein. For example, the communications manager 1020 may include a channel condition component 1025, a grant transmission component 1030, a first data precoding component 1035, a second data precoding component 1040, a multi-layer signal transmission component 1045, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The channel condition component 1025 may be configured as or otherwise support a means for receiving, from a UE, at least one uplink signal corresponding to a condition of a wireless channel. The grant transmission component 1030 may be configured as or otherwise support a means for transmitting, in response to the at least one uplink signal, a grant to the UE scheduling transmission of a multi-layer signal and indicating a demodulator configuration identifying a respective layer-specific demodulation scheme of a set of multiple demodulation schemes to apply for demodulating one or more layer groups of a set of multiple layer groups of the multi-layer signal. The first data precoding component 1035 may be configured as or otherwise support a means for precoding first data for transmission on multiple layers of the multi-layer signal in a first layer group of the set of multiple layer groups based on the demodulator configuration. The second data precoding component 1040 may be configured as or otherwise support a means for precoding second data for transmission on at least one layer of the multi-layer signal of a second layer group of the set of multiple layer groups based on the demodulator configuration. The multi-layer signal transmission component 1045 may be configured as or otherwise support a means for transmitting, to the UE, the first precoded data of the multi-layer signal via the first layer group and the second precoded data of the multi-layer signal via the second layer group.

Figure 11:
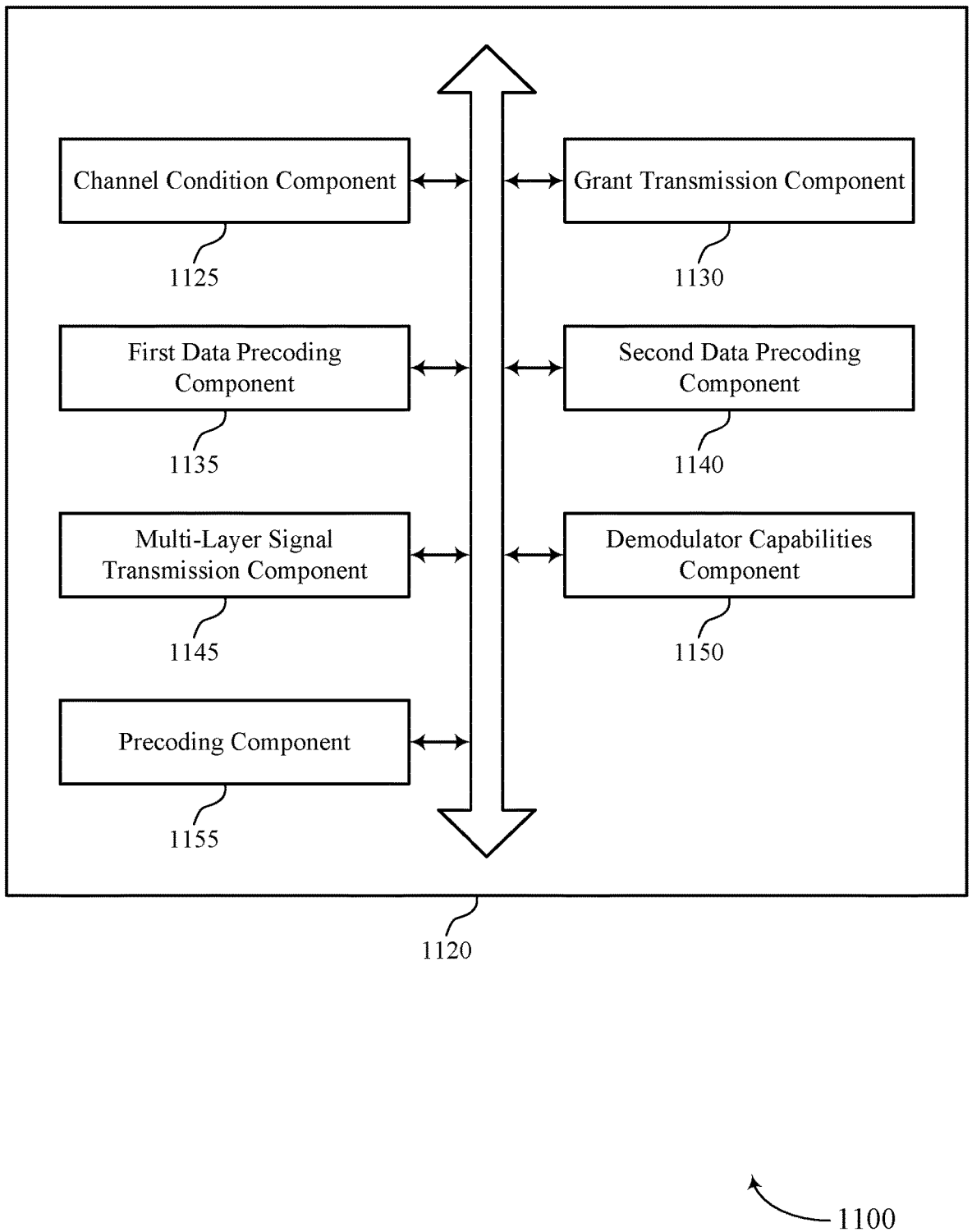
FIG. 11 shows a block diagram of a communications manager that supports a demodulator configuration based on UE signaling in accordance with aspects of the present disclosure.

FIG. 11 shows a block diagram 1100 of a communications manager 1120 that supports a demodulator configuration based on UE signaling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of a demodulator configuration based on UE signaling as described herein. For example, the communications manager 1120 may include a channel condition component 1125, a grant transmission component 1130, a first data precoding component 1135, a second data precoding component 1140, a multi-layer signal transmission component 1145, a demodulator capabilities component 1150, a precoding component 1155, or any combination thereof. Each of these components may communicate, directly or indirectly, with one another (e.g., via one or more buses).

The communications manager 1120 may support wireless communications at a base station in accordance with examples as disclosed herein. The channel condition component 1125 may be configured as or otherwise support a means for receiving, from a UE, at least one uplink signal corresponding to a condition of a wireless channel. The grant transmission component 1130 may be configured as or otherwise support a means for transmitting, in response to the at least one uplink signal, a grant to the UE scheduling transmission of a multi-layer signal and indicating a demodulator configuration identifying a respective layer-specific demodulation scheme of a set of multiple demodulation schemes to apply for demodulating one or more layer groups of a set of multiple layer groups of the multi-layer signal. The first data precoding component 1135 may be configured as or otherwise support a means for precoding first data for transmission on multiple layers of the multi-layer signal in a first layer group of the set of multiple layer groups based on the demodulator configuration. The second data precoding component 1140 may be configured as or otherwise support a means for precoding second data for transmission on at least one layer of the multi-layer signal of a second layer group of the set of multiple layer groups based on the demodulator configuration. The multi-layer signal transmission component 1145 may be configured as or otherwise support a means for transmitting, to the UE, the first precoded data of the multi-layer signal via the first layer group and the second precoded data of the multi-layer signal via the second layer group.

In some examples, to support transmitting the grant, the grant transmission component 1130 may be configured as or otherwise support a means for transmitting the grant indicating the demodulator configuration that indicates a demodulation search space corresponding to a number of layers included per layer group of the set of multiple layer groups of the multi-layer signal.

In some examples, to support transmitting the grant, the grant transmission component 1130 may be configured as or otherwise support a means for transmitting the grant indicating the demodulator configuration that corresponds to an amount of cross correlation determined between respective layers of a set of multiple layers of the set of multiple layer groups on the wireless channel.

In some examples, to support transmitting the grant, the grant transmission component 1130 may be configured as or otherwise support a means for transmitting the grant indicating the set of multiple layer groups within the multi-layer signal.

In some examples, to support receiving the at least one uplink signal, the demodulator capabilities component 1150 may be configured as or otherwise support a means for receiving the at least one uplink signal including an indication of demodulator capabilities indicating a number of layers that a demodulator of the UE is capable of jointly demodulating.

In some examples, a number of layers per layer group of the set of multiple layer groups, a number of layers for the multi-layer signal, or a combination thereof is based on the indication of the demodulator capabilities.

In some examples, the demodulator configuration is based on the indication of the demodulator capabilities.

In some examples, to support receiving the at least one uplink signal, the channel condition component 1125 may be configured as or otherwise support a means for receiving the at least one uplink signal including channel state information, one or more sounding reference signals, an indication of one or more capabilities of the UE, an indication of types of precoding supported at the UE, or a combination thereof.

In some examples, to support precoding the first data, precoding the second data, or both, the precoding component 1155 may be configured as or otherwise support a means for precoding the first precoded data, the second precoded data, or both according to one or more precoding techniques that are determined based on the at least one uplink signal.

In some examples, the one or more precoding techniques include a singular value decomposition precoding, a signal to leakage ratio precoding, or a combination thereof.

In some examples, the set of multiple demodulation schemes includes a maximum likelihood demodulation scheme, a near maximum likelihood demodulation scheme, a minimum mean square error demodulation scheme, or a combination thereof.

In some examples, each layer group of the set of multiple layer groups of the multi-layer signal include one or more layers.

Figure 12:
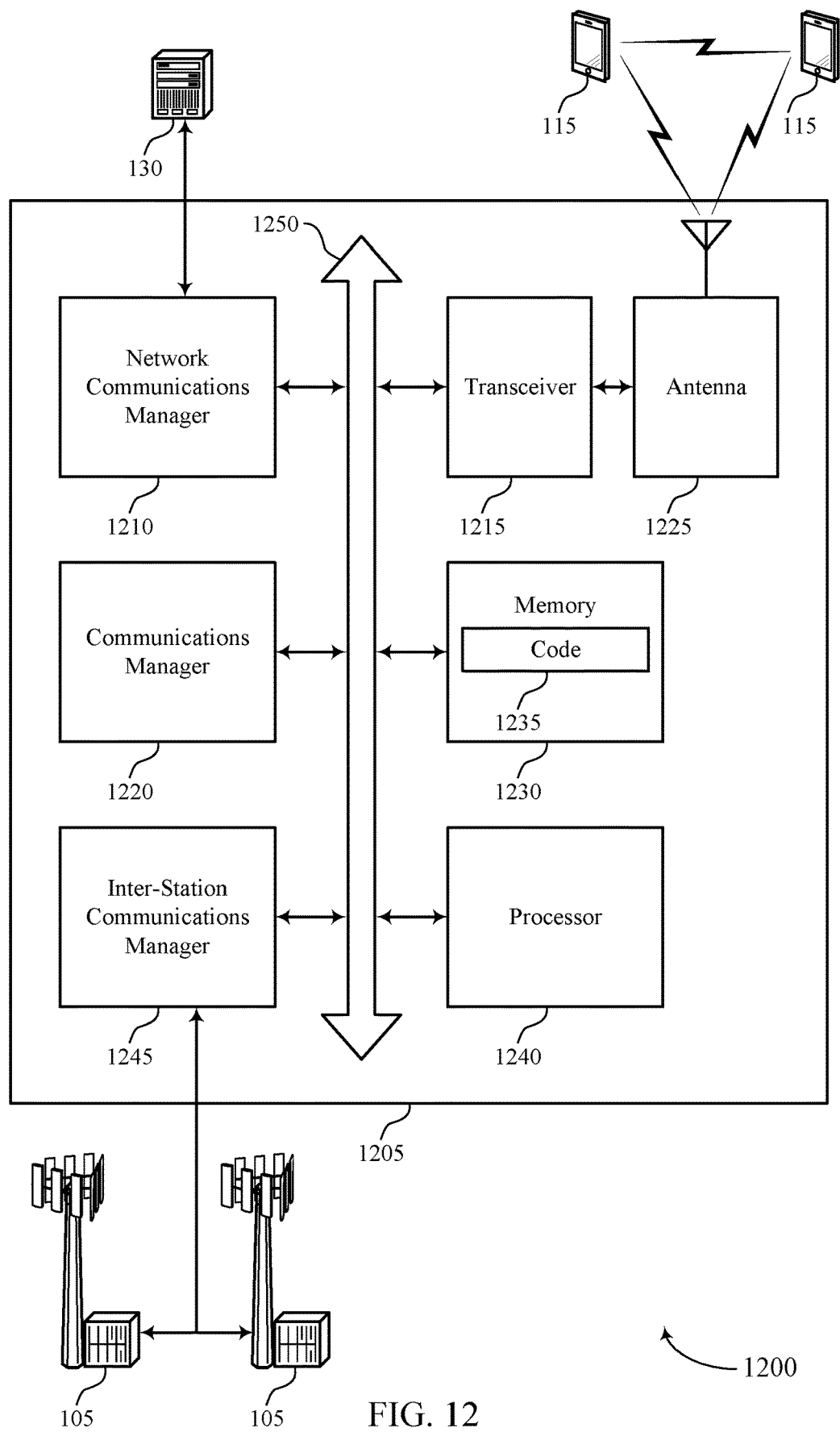
FIG. 12 shows a diagram of a system including a device that supports a demodulator configuration based on UE signaling in accordance with aspects of the present disclosure.

FIG. 12 shows a diagram of a system 1200 including a device 1205 that supports a demodulator configuration based on UE signaling in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting a demodulator configuration based on UE signaling). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, at least one uplink signal corresponding to a condition of a wireless channel. The communications manager 1220 may be configured as or otherwise support a means for transmitting, in response to the at least one uplink signal, a grant to the UE scheduling transmission of a multi-layer signal and indicating a demodulator configuration identifying a respective layer-specific demodulation scheme of a set of multiple demodulation schemes to apply for demodulating one or more layer groups of a set of multiple layer groups of the multi-layer signal. The communications manager 1220 may be configured as or otherwise support a means for precoding first data for transmission on multiple layers of the multi-layer signal in a first layer group of the set of multiple layer groups based on the demodulator configuration. The communications manager 1220 may be configured as or otherwise support a means for precoding second data for transmission on at least one layer of the multi-layer signal of a second layer group of the set of multiple layer groups based on the demodulator configuration. The communications manager 1220 may be configured as or otherwise support a means for transmitting, to the UE, the first precoded data of the multi-layer signal via the first layer group and the second precoded data of the multi-layer signal via the second layer group.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of a demodulator configuration based on UE signaling as described herein, or the processor 1240 and the memory 1230 may be otherwise configured to perform or support such operations.

Figure 13:
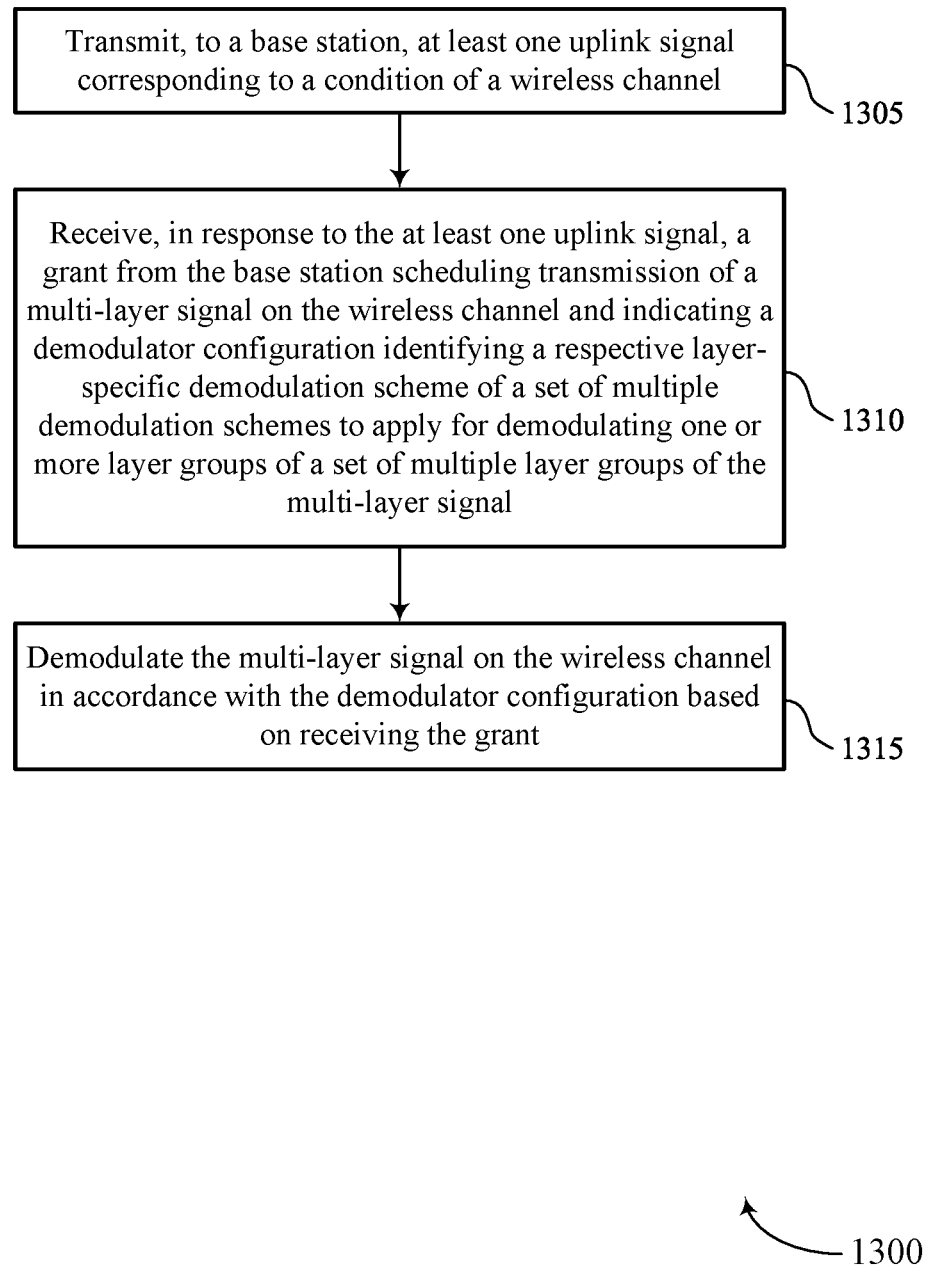
FIGS. 13 through 18 show flowcharts illustrating methods that support a demodulator configuration based on UE signaling in accordance with aspects of the present disclosure.

FIG. 13 shows a flowchart illustrating a method 1300 that supports a demodulator configuration based on UE signaling in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, at least one uplink signal corresponding to a condition of a wireless channel. The operations of 1305 may be performed in accordance with examples as disclosed herein. In some examples, aspects of the operations of 1305 may be performed by a channel condition indication component 725 as described with reference to FIG. 7.

At 1310, the method may include receiving, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal. The operations of 1310 may be performed in accordance with examples as disclosed herein. In some examples, aspects of the operations of 1310 may be performed by a demodulator configuration component 730 as described with reference to FIG. 7.

At 1315, the method may include demodulating the multi-layer signal on the wireless channel in accordance with the demodulator configuration based on receiving the grant. The operations of 1315 may be performed in accordance with examples as disclosed herein. In some examples, aspects of the operations of 1315 may be performed by a demodulation component 735 as described with reference to FIG. 7.

Figure 14:
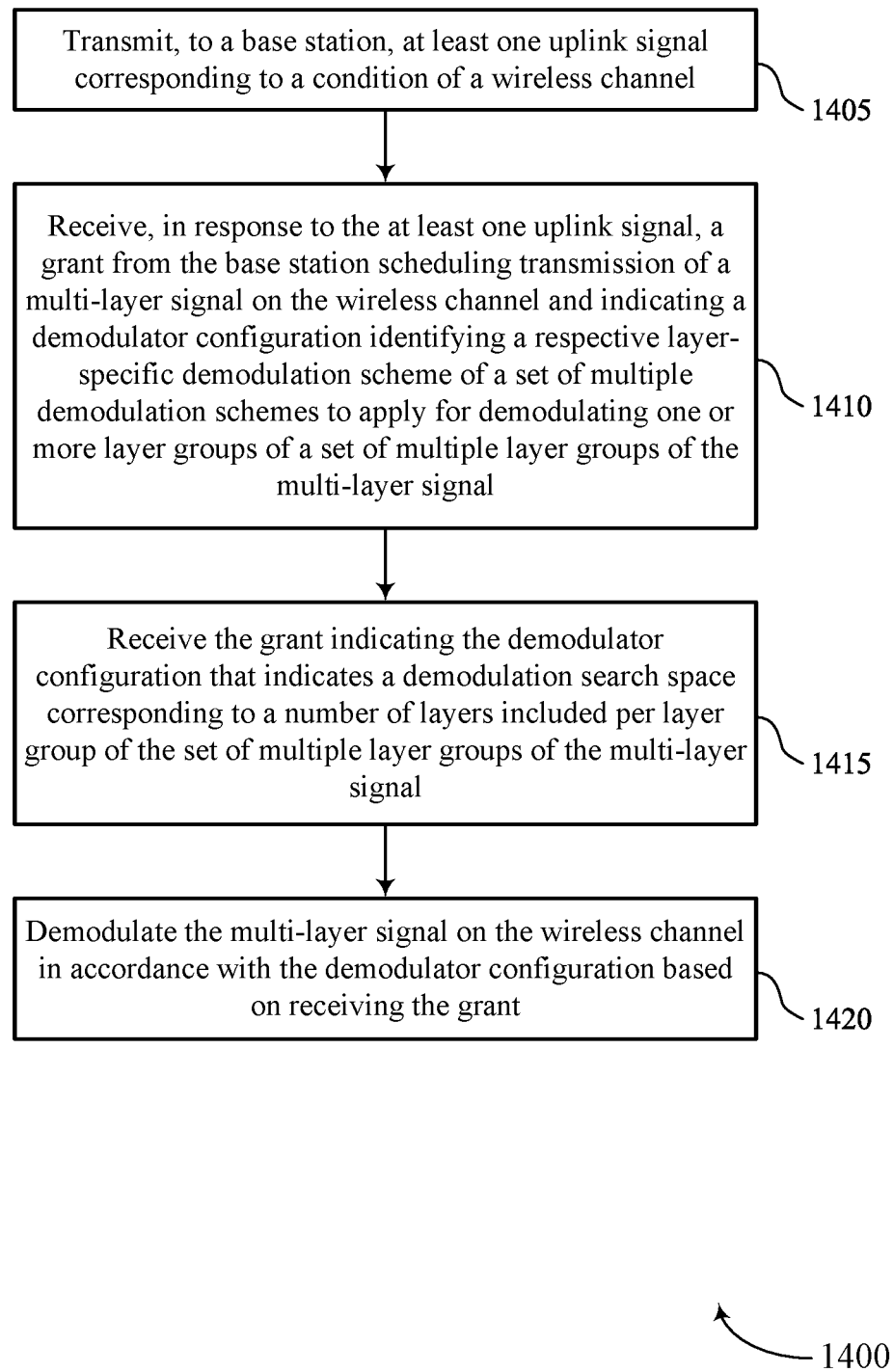

FIG. 14 shows a flowchart illustrating a method 1400 that supports a demodulator configuration based on UE signaling in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, at least one uplink signal corresponding to a condition of a wireless channel. The operations of 1405 may be performed in accordance with examples as disclosed herein. In some examples, aspects of the operations of 1405 may be performed by a channel condition indication component 725 as described with reference to FIG. 7.

At 1410, the method may include receiving, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal. The operations of 1410 may be performed in accordance with examples as disclosed herein. In some examples, aspects of the operations of 1410 may be performed by a demodulator configuration component 730 as described with reference to FIG. 7.

At 1415, the method may include receiving the grant indicating the demodulator configuration that indicates a demodulation search space corresponding to a number of layers included per layer group of the set of multiple layer groups of the multi-layer signal. The operations of 1415 may be performed in accordance with examples as disclosed herein. In some examples, aspects of the operations of 1415 may be performed by a demodulator configuration component 730 as described with reference to FIG. 7.

At 1420, the method may include demodulating the multi-layer signal on the wireless channel in accordance with the demodulator configuration based on receiving the grant. The operations of 1420 may be performed in accordance with examples as disclosed herein. In some examples, aspects of the operations of 1420 may be performed by a demodulation component 735 as described with reference to FIG. 7.

Figure 15:
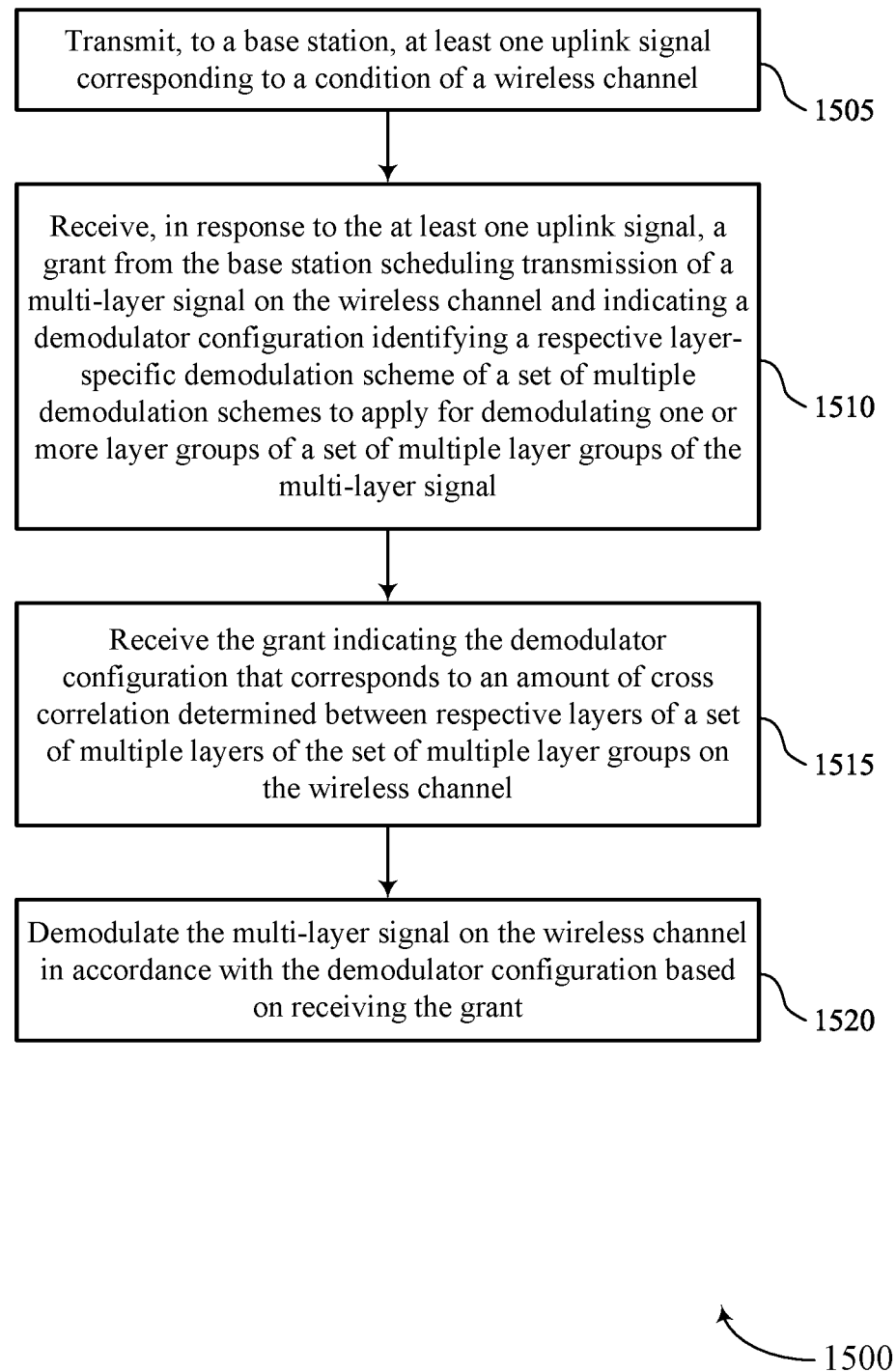

FIG. 15 shows a flowchart illustrating a method 1500 that supports a demodulator configuration based on UE signaling in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, at least one uplink signal corresponding to a condition of a wireless channel. The operations of 1505 may be performed in accordance with examples as disclosed herein. In some examples, aspects of the operations of 1505 may be performed by a channel condition indication component 725 as described with reference to FIG. 7.

At 1510, the method may include receiving, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal. The operations of 1510 may be performed in accordance with examples as disclosed herein. In some examples, aspects of the operations of 1510 may be performed by a demodulator configuration component 730 as described with reference to FIG. 7.

At 1515, the method may include receiving the grant indicating the demodulator configuration that corresponds to an amount of cross correlation determined between respective layers of a set of multiple layers of the set of multiple layer groups on the wireless channel. The operations of 1515 may be performed in accordance with examples as disclosed herein. In some examples, aspects of the operations of 1515 may be performed by a demodulator configuration component 730 as described with reference to FIG. 7.

At 1520, the method may include demodulating the multi-layer signal on the wireless channel in accordance with the demodulator configuration based on receiving the grant. The operations of 1520 may be performed in accordance with examples as disclosed herein. In some examples, aspects of the operations of 1520 may be performed by a demodulation component 735 as described with reference to FIG. 7.

Figure 16:
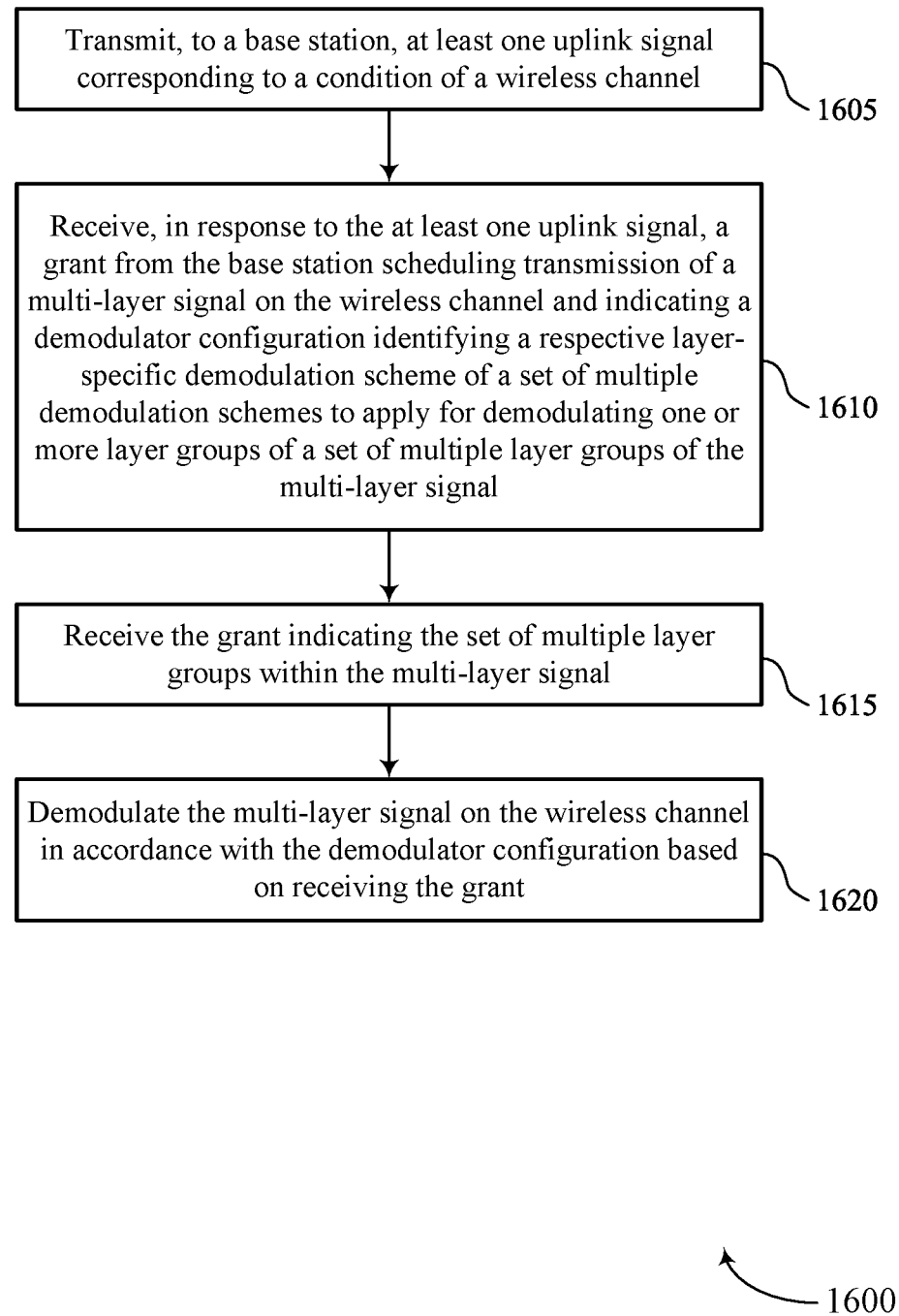

FIG. 16 shows a flowchart illustrating a method 1600 that supports a demodulator configuration based on UE signaling in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include transmitting, to a base station, at least one uplink signal corresponding to a condition of a wireless channel. The operations of 1605 may be performed in accordance with examples as disclosed herein. In some examples, aspects of the operations of 1605 may be performed by a channel condition indication component 725 as described with reference to FIG. 7.

At 1610, the method may include receiving, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal. The operations of 1610 may be performed in accordance with examples as disclosed herein. In some examples, aspects of the operations of 1610 may be performed by a demodulator configuration component 730 as described with reference to FIG. 7.

At 1615, the method may include receiving the grant indicating the set of multiple layer groups within the multi-layer signal. The operations of 1615 may be performed in accordance with examples as disclosed herein. In some examples, aspects of the operations of 1615 may be performed by a demodulator configuration component 730 as described with reference to FIG. 7.

At 1620, the method may include demodulating the multi-layer signal on the wireless channel in accordance with the demodulator configuration based on receiving the grant. The operations of 1620 may be performed in accordance with examples as disclosed herein. In some examples, aspects of the operations of 1620 may be performed by a demodulation component 735 as described with reference to FIG. 7.

Figure 17:
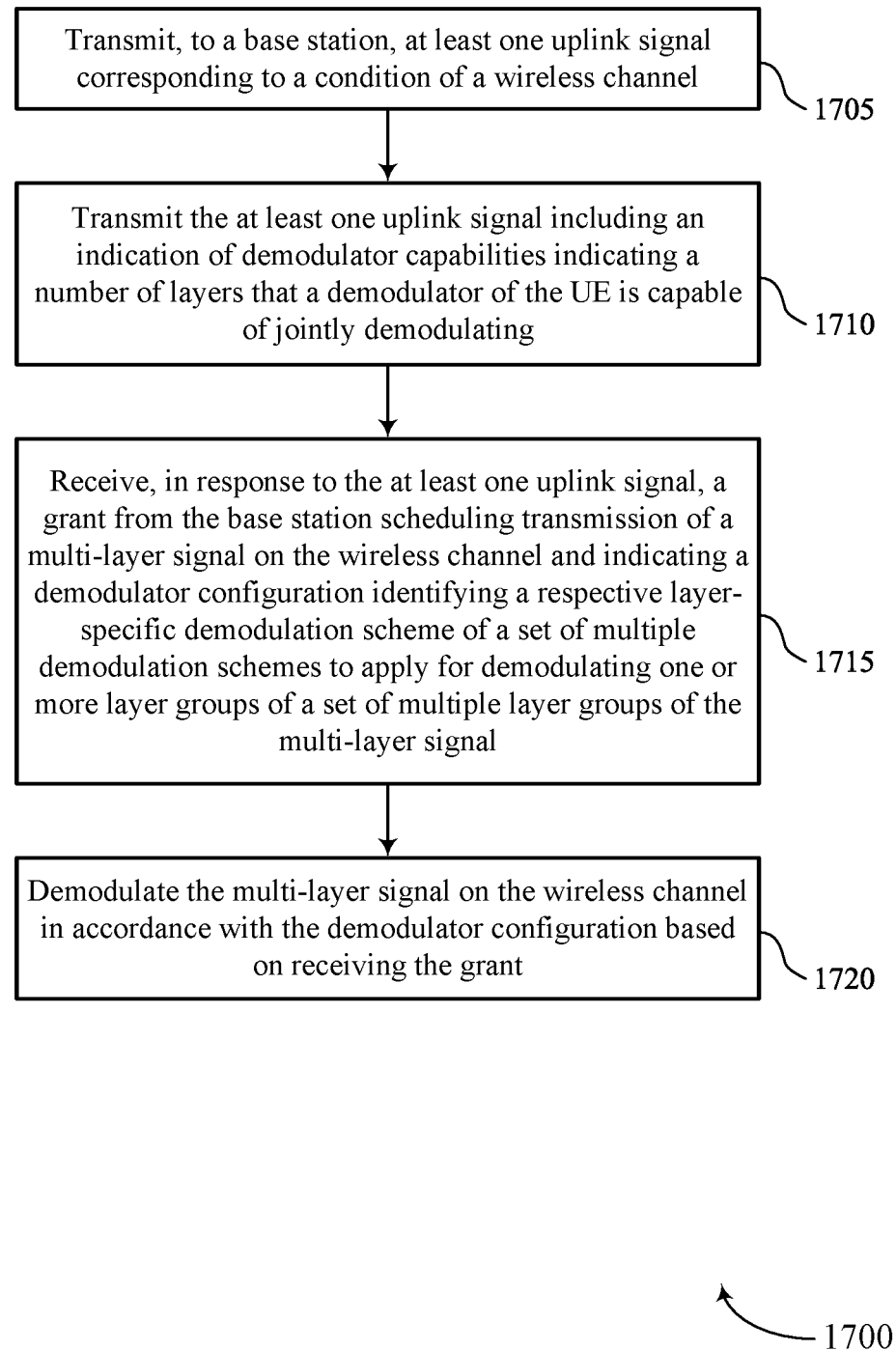

FIG. 17 shows a flowchart illustrating a method 1700 that supports a demodulator configuration based on UE signaling in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include transmitting, to a base station, at least one uplink signal corresponding to a condition of a wireless channel. The operations of 1705 may be performed in accordance with examples as disclosed herein. In some examples, aspects of the operations of 1705 may be performed by a channel condition indication component 725 as described with reference to FIG. 7.

At 1710, the method may include transmitting the at least one uplink signal including an indication of demodulator capabilities indicating a number of layers that a demodulator of the UE is capable of jointly demodulating. The operations of 1710 may be performed in accordance with examples as disclosed herein. In some examples, aspects of the operations of 1710 may be performed by a demodulator capability component 740 as described with reference to FIG. 7.

At 1715, the method may include receiving, in response to the at least one uplink signal, a grant from the base station scheduling transmission of a multi-layer signal on the wireless channel and indicating a demodulator configuration identifying a respective layer-specific demodulation scheme of a set of multiple demodulation schemes to apply for demodulating one or more layer groups of a set of multiple layer groups of the multi-layer signal. The operations of 1715 may be performed in accordance with examples as disclosed herein. In some examples, aspects of the operations of 1715 may be performed by a demodulator configuration component 730 as described with reference to FIG. 7.

At 1720, the method may include demodulating the multi-layer signal on the wireless channel in accordance with the demodulator configuration based on receiving the grant. The operations of 1720 may be performed in accordance with examples as disclosed herein. In some examples, aspects of the operations of 1720 may be performed by a demodulation component 735 as described with reference to FIG. 7.

Figure 18:
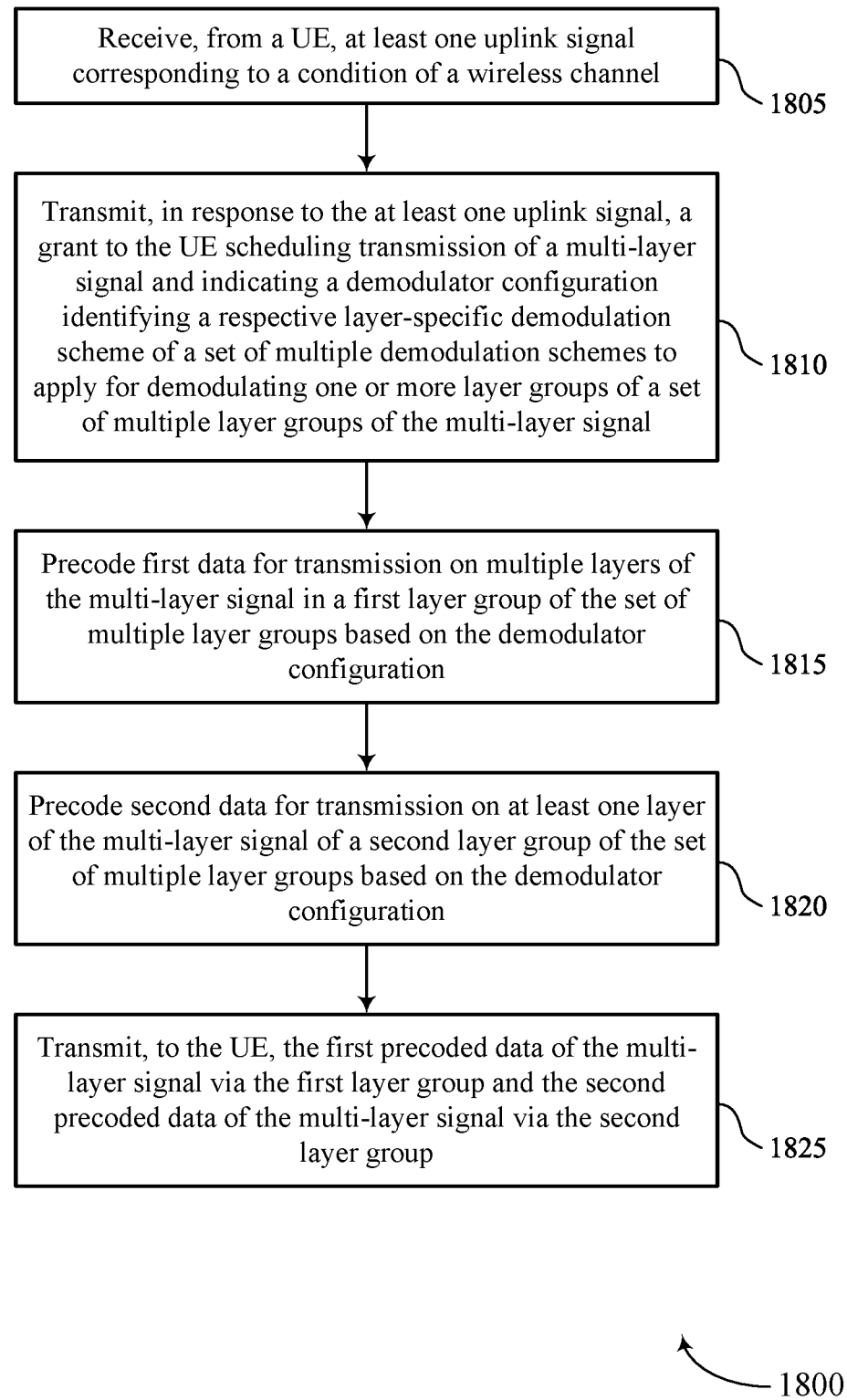

FIG. 18 shows a flowchart illustrating a method 1800 that supports a demodulator configuration based on UE signaling in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, at least one uplink signal corresponding to a condition of a wireless channel. The operations of 1805 may be performed in accordance with examples as disclosed herein. In some examples, aspects of the operations of 1805 may be performed by a channel condition component 1125 as described with reference to FIG. 11.

At 1810, the method may include transmitting, in response to the at least one uplink signal, a grant to the UE scheduling transmission of a multi-layer signal and indicating a demodulator configuration identifying a respective layer-specific demodulation scheme of a set of multiple demodulation schemes to apply for demodulating one or more layer groups of a set of multiple layer groups of the multi-layer signal. The operations of 1810 may be performed in accordance with examples as disclosed herein. In some examples, aspects of the operations of 1810 may be performed by a grant transmission component 1130 as described with reference to FIG. 11.

At 1815, the method may include precoding first data for transmission on multiple layers of the multi-layer signal in a first layer group of the set of multiple layer groups based on the demodulator configuration. The operations of 1815 may be performed in accordance with examples as disclosed herein. In some examples, aspects of the operations of 1815 may be performed by a first data precoding component 1135 as described with reference to FIG. 11.

At 1820, the method may include precoding second data for transmission on at least one layer of the multi-layer signal of a second layer group of the set of multiple layer groups based on the demodulator configuration. The operations of 1820 may be performed in accordance with examples as disclosed herein. In some examples, aspects of the operations of 1820 may be performed by a second data precoding component 1140 as described with reference to FIG. 11.

At 1825, the method may include transmitting, to the UE, the first precoded data of the multi-layer signal via the first layer group and the second precoded data of the multi-layer signal via the second layer group. The operations of 1825 may be performed in accordance with examples as disclosed herein. In some examples, aspects of the operations of 1825 may be performed by a multi-layer signal transmission component 1145 as described with reference to FIG. 11.

The following provides an overview of aspects of the present disclosure:

Aspect 1: A method for wireless communications at a UE, comprising: transmitting, to a base station, at least one uplink signal corresponding to a condition of a wireless channel; receiving, in response to the at least one uplink signal, a grant from the base station scheduling transmission of a multi-layer signal on the wireless channel and indicating a demodulator configuration identifying a respective layer-specific demodulation scheme of a plurality of demodulation schemes to apply for demodulating one or more layer groups of a plurality of layer groups of the multi-layer signal; and demodulating the multi-layer signal on the wireless channel in accordance with the demodulator configuration based at least in part on receiving the grant.

Aspect 2: The method of aspect 1, wherein receiving the grant further comprises: receiving the grant indicating the demodulator configuration that indicates a demodulation search space corresponding to a number of layers included per layer group of the plurality of layer groups of the multi-layer signal.

Aspect 3: The method of any of aspects 1 through 2, wherein receiving the grant further comprises: receiving the grant indicating the demodulator configuration that corresponds to an amount of cross correlation determined between respective layers of a plurality of layers of the plurality of layer groups on the wireless channel.

Aspect 4: The method of any of aspects 1 through 3, wherein receiving the grant further comprises: receiving the grant indicating the plurality of layer groups within the multi-layer signal.

Aspect 5: The method of any of aspects 1 through 4, wherein transmitting the at least one uplink signal comprises: transmitting the at least one uplink signal comprising an indication of demodulator capabilities indicating a number of layers that a demodulator of the UE is capable of jointly demodulating.

Aspect 6: The method of aspect 5, wherein a number of layers per layer group of the plurality of layer groups, a number of layers for the multi-layer signal, or a combination thereof is based at least in part on the indication of the demodulator capabilities.

Aspect 7: The method of any of aspects 5 through 6, wherein the demodulator configuration is based at least in part on the indication of the demodulator capabilities.

Aspect 8: The method of any of aspects 1 through 7, wherein transmitting the at least one uplink signal comprises: transmitting the at least one uplink signal comprising channel state information, one or more sounding reference signals, an indication of one or more capabilities of the UE, an indication of types of precoding supported at the UE, or a combination thereof.

Aspect 9: The method of any of aspects 1 through 8, wherein the plurality of demodulation schemes comprises a maximum likelihood demodulation scheme, a near maximum likelihood demodulation scheme, a minimum mean square error demodulation scheme, or a combination thereof.

Aspect 10: The method of any of aspects 1 through 9, wherein each layer group of the plurality of layer groups of the multi-layer signal comprise one or more layers.

Aspect 11: A method for wireless communications at a base station, comprising: receiving, from a UE, at least one uplink signal corresponding to a condition of a wireless channel; transmitting, in response to the at least one uplink signal, a grant to the UE scheduling transmission of a multi-layer signal and indicating a demodulator configuration identifying a respective layer-specific demodulation scheme of a plurality of demodulation schemes to apply for demodulating one or more layer groups of a plurality of layer groups of the multi-layer signal; precoding first data for transmission on multiple layers of the multi-layer signal in a first layer group of the plurality of layer groups based at least in part on the demodulator configuration; precoding second data for transmission on at least one layer of the multi-layer signal of a second layer group of the plurality of layer groups based at least in part on the demodulator configuration; and transmitting, to the UE, the first precoded data of the multi-layer signal via the first layer group and the second precoded data of the multi-layer signal via the second layer group.

Aspect 12: The method of aspect 11, wherein transmitting the grant further comprises: transmitting the grant indicating the demodulator configuration that indicates a demodulation search space corresponding to a number of layers included per layer group of the plurality of layer groups of the multi-layer signal.

Aspect 13: The method of any of aspects 11 through 12, wherein transmitting the grant further comprises: transmitting the grant indicating the demodulator configuration that corresponds to an amount of cross correlation determined between respective layers of a plurality of layers of the plurality of layer groups on the wireless channel.

Aspect 14: The method of any of aspects 11 through 13, wherein transmitting the grant further comprises: transmitting the grant indicating the plurality of layer groups within the multi-layer signal.

Aspect 15: The method of any of aspects 11 through 14, wherein receiving the at least one uplink signal comprises: receiving the at least one uplink signal comprising an indication of demodulator capabilities indicating a number of layers that a demodulator of the UE is capable of jointly demodulating.

Aspect 16: The method of aspect 15, further comprising: determining a number of layers per layer group of the plurality of layer groups, a number of layers for the multi-layer signal, data included in the multi-layer signal, or a combination thereof based at least in part on the indication of the demodulator capabilities.

Aspect 17: The method of any of aspects 15 through 16, further comprising: determining the demodulator configuration that suggests a number of layers of the multi-layer signal to jointly demodulate based at least in part on the indication of the demodulator capabilities.

Aspect 18: The method of any of aspects 11 through 17, wherein receiving the at least one uplink signal comprises: receiving the at least one uplink signal comprising channel state information, one or more sounding reference signals, an indication of one or more capabilities of the UE, an indication of types of precoding supported at the UE, or a combination thereof.

Aspect 19: The method of any of aspects 11 through 18, wherein precoding the first data, precoding the second data, or both comprises: precoding the first precoded data, the second precoded data, or both according to one or more precoding techniques that are determined based at least in part on the at least one uplink signal.

Aspect 20: The method of aspect 19, wherein the one or more precoding techniques comprise a singular value decomposition precoding, a signal to leakage ratio precoding, or a combination thereof.

Aspect 21: The method of any of aspects 11 through 20, wherein the plurality of demodulation schemes comprises a maximum likelihood demodulation scheme, a near maximum likelihood demodulation scheme, a minimum mean square error demodulation scheme, or a combination thereof.

Aspect 22: The method of any of aspects 11 through 21, wherein each layer group of the plurality of layer groups of the multi-layer signal comprise one or more layers.

Aspect 23: An apparatus for wireless communications at a UE, comprising a processor; memory coupled with the processor; and instructions stored in the memory and executable by the processor to cause the apparatus to perform a method of any of aspects 1 through 10.

Aspect 24: An apparatus for wireless communications at a UE, comprising at least one means for performing a method of any of aspects 1 through 10.

Aspect 25: A non-transitory computer-readable medium storing code for wireless communications at a UE, the code comprising instructions executable by a processor to perform a method of any of aspects 1 through 10.

Aspect 26: An apparatus for wireless communications at a base station, comprising a processor; memory coupled with the processor; and instructions stored in the memory and executable by the processor to cause the apparatus to perform a method of any of aspects 11 through 22.

Aspect 27: An apparatus for wireless communications at a base station, comprising at least one means for performing a method of any of aspects 11 through 22.

Aspect 28: A non-transitory computer-readable medium storing code for wireless communications at a base station, the code comprising instructions executable by a processor to perform a method of any of aspects 11 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    transmitting, to a network entity, at least one uplink signal corresponding to a condition of a wireless channel;
    receiving, in response to the at least one uplink signal, a grant from the network entity scheduling transmission of a multi-layer signal on the wireless channel and indicating a demodulator configuration that indicates one or more layer-specific demodulation schemes of a plurality of demodulation schemes for the UE to use to demodulate the multi-layer signal, the demodulator configuration identifying a respective layer-specific demodulation scheme of the one or more layer-specific demodulation schemes to apply for demodulating one or more layer groups of a plurality of layer groups of the multi-layer signal; and
    demodulating the multi-layer signal on the wireless channel in accordance with the demodulator configuration identifying the respective layer-specific demodulation scheme of the one or more layer-specific demodulation schemes based at least in part on receiving the grant, wherein the respective layer-specific demodulation scheme is associated with a demodulator type associated with a quantity of layers of the multi-layer signal, a demodulator size associated with the quantity of layers of the multi-layer signal, or both.

2. The method of claim 1, wherein receiving the grant further comprises:
    receiving the grant indicating the demodulator configuration that indicates a demodulation search space corresponding to a number of layers included per layer group of the plurality of layer groups of the multi-layer signal.

3. The method of claim 1, wherein receiving the grant further comprises:
receiving the grant indicating the demodulator configuration that corresponds to an amount of cross correlation determined between respective layers of a plurality of layers of the plurality of layer groups on the wireless channel.

4. The method of claim 1, wherein receiving the grant further comprises:
receiving the grant indicating the plurality of layer groups within the multi-layer signal.

5. The method of claim 1, wherein transmitting the at least one uplink signal comprises:
transmitting the at least one uplink signal comprising an indication of demodulator capabilities indicating a number of layers that a demodulator of the UE is capable of jointly demodulating.

6. The method of claim 5, wherein a number of layers per layer group of the plurality of layer groups, a number of layers for the multi-layer signal, or a combination thereof is based at least in part on the indication of the demodulator capabilities.

7. The method of claim 5, wherein the demodulator configuration is based at least in part on the indication of the demodulator capabilities.

8. The method of claim 1, wherein transmitting the at least one uplink signal comprises:
transmitting the at least one uplink signal comprising channel state information, one or more sounding reference signals, an indication of one or more capabilities of the UE, an indication of types of precoding supported at the UE, or a combination thereof.

9. The method of claim 1, wherein the plurality of demodulation schemes comprises a maximum likelihood demodulation scheme, a near maximum likelihood demodulation scheme, a minimum mean square error demodulation scheme, or a combination thereof.

10. The method of claim 1, wherein each layer group of the plurality of layer groups of the multi-layer signal comprise one or more layers.

11. A method for wireless communications at a network entity, comprising:
receiving, from a user equipment (UE), at least one uplink signal corresponding to a condition of a wireless channel;
transmitting, in response to the at least one uplink signal, a grant to the UE scheduling transmission of a multi-layer signal and indicating a demodulator configuration that indicates one or more layer-specific demodulation schemes of a plurality of demodulation schemes for the UE to use to demodulate the multi-layer signal, the demodulator configuration identifying a respective layer-specific demodulation scheme of the one or more layer-specific demodulation schemes to apply for demodulating one or more layer groups of a plurality of layer groups of the multi-layer signal;
precoding first data for transmission on multiple layers of the multi-layer signal in a first layer group of the plurality of layer groups based at least in part on the demodulator configuration identifying a first layer-specific demodulation scheme of the one or more layer-specific demodulation schemes, wherein the first layer-specific demodulation scheme is associated with a first demodulator type associated with a quantity of layers of the first layer group, a first demodulator size associated with the quantity of layers of the first layer group, or both;
precoding second data for transmission on at least one layer of the multi-layer signal of a second layer group of the plurality of layer groups based at least in part on the demodulator configuration identifying a second layer-specific demodulation scheme of the one or more layer-specific demodulation schemes, wherein the second layer-specific demodulation scheme is associated with a second demodulator type associated with a quantity of layers of the second layer group, a second demodulator size associated with the quantity of layers of the second layer group, or both; and
transmitting, to the UE, the first precoded data of the multi-layer signal via the first layer group and the second precoded data of the multi-layer signal via the second layer group.

12. The method of claim 11, wherein transmitting the grant further comprises:
transmitting the grant indicating the demodulator configuration that indicates a demodulation search space corresponding to a number of layers included per layer group of the plurality of layer groups of the multi-layer signal.

13. The method of claim 11, wherein transmitting the grant further comprises:
transmitting the grant indicating the demodulator configuration that corresponds to an amount of cross correlation determined between respective layers of a plurality of layers of the plurality of layer groups on the wireless channel.

14. The method of claim 11, wherein transmitting the grant further comprises:
transmitting the grant indicating the plurality of layer groups within the multi-layer signal.

15. The method of claim 11, wherein receiving the at least one uplink signal comprises:
receiving the at least one uplink signal comprising an indication of demodulator capabilities indicating a number of layers that a demodulator of the UE is capable of jointly demodulating.

16. The method of claim 15, further comprising:
determining a number of layers per layer group of the plurality of layer groups, a number of layers for the multi-layer signal, data included in the multi-layer signal, or a combination thereof based at least in part on the indication of the demodulator capabilities.

17. The method of claim 15, further comprising:
determining the demodulator configuration that suggests a number of layers of the multi-layer signal to jointly demodulate based at least in part on the indication of the demodulator capabilities.

18. The method of claim 11, wherein receiving the at least one uplink signal comprises:
receiving the at least one uplink signal comprising channel state information, one or more sounding reference signals, an indication of one or more capabilities of the UE, an indication of types of precoding supported at the UE, or a combination thereof.

19. The method of claim 11, wherein precoding the first data, precoding the second data, or both comprises:
precoding the first precoded data, the second precoded data, or both according to one or more precoding techniques that are determined based at least in part on the at least one uplink signal.

20. The method of claim 19, wherein the one or more precoding techniques comprise a singular value decomposition precoding, a signal to leakage ratio precoding, or a combination thereof.

21. The method of claim 11, wherein the plurality of demodulation schemes comprises a maximum likelihood demodulation scheme, a near maximum likelihood demodulation scheme, a minimum mean square error demodulation scheme, or a combination thereof.

22. The method of claim 11, wherein each layer group of the plurality of layer groups of the multi-layer signal comprise one or more layers.

23. An apparatus for wireless communications at a user equipment (UE), comprising:
a processor;
memory coupled to the processor, the memory comprising instructions executable by the processor to cause the apparatus to:
transmit, to a network entity, at least one uplink signal corresponding to a condition of a wireless channel;
receive, in response to the at least one uplink signal, a grant from the network entity scheduling transmission of a multi-layer signal on the wireless channel and indicating a demodulator configuration that indicates one or more layer-specific demodulation schemes of a plurality of demodulation schemes for the UE to use to demodulate the multi-layer signal, the demodulator configuration identifying a respective layer-specific demodulation scheme of the one or more layer-specific demodulation schemes to apply for demodulating one or more layer groups of a plurality of layer groups of the multi-layer signal; and
demodulate the multi-layer signal on the wireless channel in accordance with the demodulator configuration identifying the respective layer-specific demodulation scheme of the one or more layer-specific demodulation schemes based at least in part on receiving the grant, wherein the respective layer-specific demodulation scheme is associated with a demodulator type associated with a quantity of layers of the multi-layer signal, a demodulator size associated with the quantity of layers of the multi-layer signal, or both.

24. The apparatus of claim 23, wherein the instructions to receive the grant are further executable by the processor to cause the apparatus to:
receive the grant indicating the demodulator configuration that indicates a demodulation search space corresponding to a number of layers included per layer group of the plurality of layer groups of the multi-layer signal.

25. The apparatus of claim 23, wherein the instructions to receive the grant are further executable by the processor to cause the apparatus to:
receive the grant indicating the demodulator configuration that corresponds to an amount of cross correlation determined between respective layers of a plurality of layers of the plurality of layer groups on the wireless channel.

26. The apparatus of claim 23, wherein the instructions to receive the grant are further executable by the processor to cause the apparatus to:
receive the grant indicating the plurality of layer groups within the multi-layer signal.

27. The apparatus of claim 23, wherein the instructions to transmit the at least one uplink signal are executable by the processor to cause the apparatus to:
transmit the at least one uplink signal comprising an indication of demodulator capabilities indicating a number of layers that a demodulator of the UE is capable of jointly demodulating.

28. The apparatus of claim 27, wherein a number of layers per layer group of the plurality of layer groups, a number of layers for the multi-layer signal, or a combination thereof is based at least in part on the indication of the demodulator capabilities.

29. The apparatus of claim 23, wherein the instructions to transmit the at least one uplink signal are executable by the processor to cause the apparatus to:
transmit the at least one uplink signal comprising channel state information, one or more sounding reference signals, an indication of one or more capabilities of the UE, an indication of types of precoding supported at the UE, or a combination thereof.

30. An apparatus for wireless communications at a network entity, comprising:
a processor;
memory coupled to the processor, the memory comprising instructions executable by the processor to cause the apparatus to:
receive, from a user equipment (UE), at least one uplink signal corresponding to a condition of a wireless channel;
transmit, in response to the at least one uplink signal, a grant to the UE scheduling transmission of a multi-layer signal and indicating a demodulator configuration that indicates one or more layer-specific demodulation schemes of a plurality of demodulation schemes for the UE to use to demodulate the multi-layer signal, the demodulator configuration identifying a respective layer-specific demodulation scheme of the one or more layer-specific demodulation schemes to apply for demodulating one or more layer groups of a plurality of layer groups of the multi-layer signal;
precode first data for transmission on multiple layers of the multi-layer signal in a first layer group of the plurality of layer groups based at least in part on the demodulator configuration identifying a first layer-specific demodulation scheme of the one or more layer-specific demodulation schemes, wherein the first layer-specific demodulation scheme is associated with a first demodulator type associated with a quantity of layers of the first layer group, a first demodulator size associated with the quantity of layers of the first layer group, or both;
precode second data for transmission on at least one layer of the multi-layer signal of a second layer group of the plurality of layer groups based at least in part on the demodulator configuration identifying a second layer-specific demodulation scheme of the one or more layer-specific demodulation schemes, wherein the second layer-specific demodulation scheme is associated with a second demodulator type associated with a quantity of layers of the second layer group, a second demodulator size associated with the quantity of layers of the second layer group, or both; and
transmit, to the UE, the first precoded data of the multi-layer signal via the first layer group and the second precoded data of the multi-layer signal via the second layer group.

* * * * *